US012724314B2

(12) United States Patent
Chen et al.

(10) Patent No.: US 12,724,314 B2
(45) Date of Patent: Sep. 1, 2026

(54) ELECTRONIC PRINTING SYSTEM INCLUDING IMAGING APPARATUS AND ELECTRONIC PAPER, METHOD OF OPERATING ELECTRONIC PRINTING SYSTEM, AND METHOD OF FABRICATING IMAGING APPARATUS

(71) Applicants: Beijing BOE Technology Development Co., Ltd., Beijing (CN); BOE Technology Group Co., Ltd., Beijing (CN)

(72) Inventors: Jiangbo Chen, Beijing (CN); Zeyuan Li, Beijing (CN); Fanli Meng, Beijing (CN); Ji Peng, Beijing (CN); Hu Meng, Beijing (CN); Liye Duan, Beijing (CN)

(73) Assignees: Beijing BOE Technology Development Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 307 days.

(21) Appl. No.: 18/577,410

(22) PCT Filed: Feb. 16, 2023

(86) PCT No.: PCT/CN2023/076433
§ 371 (c)(1),
(2) Date: Jan. 8, 2024

(87) PCT Pub. No.: WO2024/168678
PCT Pub. Date: Aug. 22, 2024

(65) Prior Publication Data
US 2025/0093726 A1 Mar. 20, 2025

(51) Int. Cl.
*G02F 1/167* (2019.01)
*B41J 3/46* (2006.01)
(Continued)

(52) U.S. Cl.
CPC ................ *G02F 1/167* (2013.01); *B41J 3/46* (2013.01); *B41J 29/00* (2013.01); *G02F 1/1676* (2019.01);
(Continued)

(58) Field of Classification Search
CPC .. B41J 29/00; B41J 3/46; B41J 3/4076; B60R 13/04; G02F 1/167; G02F 1/1676;
(Continued)

(56) References Cited

U.S. PATENT DOCUMENTS 6,407,763 B1 * 6/2002 Yamaguchi ........ G03G 15/6597 347/112
2002/0141801 A1 10/2002 Shimoda et al.
(Continued)

FOREIGN PATENT DOCUMENTS

CN 1252538 A 5/2000
CN 1914554 A 2/2007
(Continued)

OTHER PUBLICATIONS

International Search Report & Written Opinion mailed Nov. 9, 2023, regarding PCT/CN2023/076433.

*Primary Examiner* — Richard J Hong
(74) *Attorney, Agent, or Firm* — Intellectual Valley Law, P.C.

(57) ABSTRACT

An electronic printing system includes an imaging apparatus and an electronic paper that can be detached from each other and can be coupled together to perform one or more functionalities. The imaging apparatus includes a first electrode and a first passivation layer. The electronic paper includes a second electrode, an electro-optic layer on the second electrode, and a second passivation layer on a side of the electro-optic layer away from the second electrode. When the imaging apparatus and the electronic paper are coupled
(Continued)

together, the first electrode, the first passivation layer, the second passivation layer, the electro-optic layer, and the second electrode are sequentially arranged in a stacked structure, the first electrode and the second electrode being configured to apply an electric field to the electro-optic layer. The first passivation layer and the second passivation layer can be detached from each other.

13 Claims, 24 Drawing Sheets

(51) Int. Cl.

| | |
|---|---|
| ***B41J 29/00*** | (2006.01) |
| ***G02F 1/1676*** | (2019.01) |
| *B60R 13/04* | (2006.01) |
| *H04N 1/00* | (2006.01) |
| *H04N 1/04* | (2006.01) |

(52) U.S. Cl.
CPC .......... *B60R 13/04* (2013.01); *H04N 1/00129* (2013.01); *H04N 1/04* (2013.01); *H04N 2201/0094* (2013.01)

(58) Field of Classification Search
CPC ............... G02F 1/16766; G02F 1/1677; G02F 1/13338; G02F 1/16756; H04N 1/00129; H04N 1/04; H04N 2201/0094; G09G 3/3446; G09F 9/00; H01B 3/004; G03G 15/6597
See application file for complete search history.

(56) References Cited

U.S. PATENT DOCUMENTS

2006/0262257 A1* 11/2006 Hattori .................... G02F 1/167 349/114
2011/0141082 A1* 6/2011 Yamazaki ............ G09G 3/3446 345/107
2012/0162186 A1* 6/2012 Kim ........................ G02F 1/167 345/212
2013/0003162 A1* 1/2013 Leoni .................. G02F 1/16756 359/296
2013/0088769 A1 4/2013 Fujishiro et al.
2014/0022625 A1* 1/2014 Fallon .................... B41J 3/4076 359/296
2014/0111593 A1* 4/2014 Wang ..................... B41J 3/4076 347/141
2014/0240299 A1* 8/2014 Gila ....................... B41J 3/4076 345/179
2015/0168799 A1 6/2015 Emori
2015/0301426 A1* 10/2015 Leoni ...................... G02F 1/167 359/296
2016/0275906 A1 9/2016 Scott et al.
2017/0052421 A1* 2/2017 Chun ..................... H01B 3/004
2020/0026142 A1 1/2020 Park et al.
2020/0147978 A1* 5/2020 Gila ....................... B41J 3/4076
2020/0150509 A1* 5/2020 Gila .................... G02F 1/13338
2024/0053844 A1* 2/2024 Xu ............................ G09F 9/00

FOREIGN PATENT DOCUMENTS

CN 102053443 A 5/2011
CN 201931717 U 8/2011
CN 102929065 A 2/2013
CN 102934017 A 2/2013
CN 104285178 A 1/2015
CN 106328068 A 1/2017
CN 109791339 A 5/2019
CN 113380201 A 9/2021
CN 114496404 A 5/2022
JP 2009288422 A 12/2009

* cited by examiner

ELECTRONIC PRINTING SYSTEM INCLUDING IMAGING APPARATUS AND ELECTRONIC PAPER, METHOD OF OPERATING ELECTRONIC PRINTING SYSTEM, AND METHOD OF FABRICATING IMAGING APPARATUS

CROSS-REFERENCE TO RELATED APPLICATION

This application is a national stage application under 35 U.S.C. § 371 of International Application No. PCT/CN2023/076433, filed Feb. 16, 2023, the contents of which are incorporated by reference in the entirety.

TECHNICAL FIELD

The present invention relates to display technology, more particularly, to an electronic printing system, a method of operating an electronic printing system, and a method of fabricating an imaging apparatus.

BACKGROUND

Electronic paper is ultra-thin, rewritable, easy to carry, and can maintain image display even when the power is off. Electronic paper has been developed to replace the traditional paper, thus reducing the use of paper. There are six different types of e-paper technology including E-Ink microcapsule technology, SiPix microcup technology, Bridgestone e-liquid powder technology, cholesteric liquid crystal display technology, microelectromechanical system technology and electric wetting technology. In one particular example, the electronic paper uses electrophoretic display technology, in which particles contained in microcapsules are immersed in a transparent liquid or a liquid having a color. Moving the particles in the microcapsules under an applied electric field enables white and black image display.

SUMMARY

In one aspect, the present disclosure provides an electronic printing system, comprising an imaging apparatus and an electronic paper that can be detached from each other and can be coupled together to perform one or more functionalities; wherein the imaging apparatus comprises a first electrode and a first passivation layer on the first electrode; wherein the electronic paper comprises a second electrode, an electro-optic layer on the second electrode, and a second passivation layer on a side of the electro-optic layer away from the second electrode; wherein, when the imaging apparatus and the electronic paper are coupled together to perform at least one of the one or more functionalities, the first electrode, the first passivation layer, the second passivation layer, the electro-optic layer, and the second electrode are sequentially arranged in a stacked structure, the first electrode and the second electrode being configured to apply an electric field to the electro-optic layer; wherein, the first passivation layer and the second passivation layer can be detached from each other.

Optionally, the electronic paper is a passive electronic paper.

Optionally, the imaging apparatus comprises a first transistor, a capacitor, and the first electrode; a gate electrode of the first transistor is coupled to a gate line which is coupled to a gate driving integrated circuit; a first source electrode of the first transistor is coupled to a data line which is coupled to a data driving integrated circuit; a first drain electrode of the first transistor is coupled to the first electrode and a second capacitor electrode of the capacitor; and a first capacitor electrode of the capacitor is coupled to a reference signal line.

Optionally, the imaging apparatus comprises a first transistor, a second transistor, a capacitor, and the first electrode; a gate electrode of the first transistor is coupled to a first gate line which is coupled to a gate driving integrated circuit; a first source electrode of the first transistor is coupled to a data line which is coupled to a data driving integrated circuit; a first drain electrode of the first transistor is coupled to the first electrode and a second capacitor electrode of the capacitor; a gate electrode of the second transistor is coupled to a second gate line which is coupled to the gate driving integrated circuit; a second source electrode of the second transistor is coupled to a read line; a second drain electrode of the second transistor is coupled to the first electrode and the second capacitor electrode of the capacitor; and a first capacitor electrode of the capacitor is coupled to a reference signal line.

Optionally, the read line is the data line.

Optionally, the electronic printing system further comprises a connecting line connecting the second drain electrode of the second transistor to the read line.

Optionally, the read line is in a same layer as source electrodes and drain electrodes of the first transistor and the second transistor, and the second capacitor electrode; the connecting line is in a same layer as the first electrode; and the connecting line extends through at least one of a planarization layer or a third passivation layer to connect to the second drain electrode of the second transistor, and extends through at least one of the planarization layer or the third passivation layer to connect to the read line.

Optionally, the read line is in a same layer as source electrodes and drain electrodes of the first transistor and the second transistor, and the second capacitor electrode; the connecting line is in a same layer as gate electrodes of the first transistor and the second transistor; the second drain electrode extends through at least an inter-layer dielectric layer to connect to the connecting line; and the read line extends through at least the inter-layer dielectric layer to connect to the connecting line.

Optionally, the first passivation layer encapsulates transistors and capacitors of the imaging apparatus; and the first passivation layer is a multiple layer structure comprising sub-layers made of silicon oxide (SiOy), silicon nitride (SiNy, e.g., $Si_3N_4$), silicon oxynitride ($SiO_xN_y$), or graphene.

Optionally, the second passivation layer encapsulates the electro-optic layer and the second electrode of the electronic paper; and the second passivation layer is a multiple layer structure comprising sub-layers made of silicon oxide (SiOy), silicon nitride (SiNy, e.g., $Si_3N_4$), silicon oxynitride ($SiO_xN_y$), or graphene.

Optionally, the second electrode comprises a non-transparent electrode material.

Optionally, the first electrode comprises a non-transparent electrode material, and the second electrode comprises a non-transparent electrode material.

Optionally, the second electrode is a second base substrate of the electronic paper; the electronic paper is absent of a layer that covers a side of the second electrode away from the electro-optic layer and the second electrode; the imaging apparatus has a first size; the electronic paper has a second size; and the first size is greater than the second size.

In another aspect, the present disclosure provides a method of operating an electronic printing system, comprising providing an imaging apparatus and an electronic paper that can be detached from each other and can be coupled together to perform one or more functionalities; and assembling the imaging apparatus and the electronic paper so that a first electrode from the imaging apparatus and a second electrode from the electronic paper are capable of forming an electric field for driving an electro-optic layer in the electronic paper.

Optionally, the method further comprises printing an image on the electronic paper by turning on a first transistor in the imaging apparatus by an effective voltage of a gate driving signal provided by a first gate line; allowing a data signal provided by a data line to pass through the first transistor, charging a capacitor and the first electrode in the imaging apparatus; and applying an electric field formed by the first electrode from the imaging apparatus and the second electrode from the electronic paper to the electro-optic layer in the electronic paper, thereby electronically printing an image on the electronic paper.

Optionally, the method further comprises resetting the electronic paper to an initial state by providing a reset signal through a data line to first electrodes respectively in all units of the imaging apparatus.

Optionally, the method further comprises scanning an image displayed on the electronic paper by assembling the imaging apparatus and the electronic paper so that the first electrode from the imaging apparatus and the electro-optic layer from the electronic paper are close enough to induce a charge in the first electrode by a unit in the electro-optic layer; and detecting the charge as a sensing signal by transmitting the sensing signal through a signal line to a detection integrated circuit.

Optionally, prior to inducing the charge in the first electrode, the method further comprises resetting the capacitor; and applying a constant voltage signal to the second electrode to induce a charge in the unit of the electronic paper.

Optionally, the method further comprises inducing the charge in the first electrode by the constant voltage signal applied to the second electrode; turning on a second transistor by an effective voltage of a second gate driving signal provided by a second gate line; and transmitting a sensing signal caused by the charge on the first electrode through the second transistor and a data line to a detection integrated circuit.

Optionally, the method further comprises conforming a shape of the imaging apparatus to a shape of an object having the electronic paper attached thereon; and performing the one or more functionalities with the imaging apparatus and the electronic paper having complementary conforming shapes.

In another aspect, the present disclosure provides a method of fabricating an imaging apparatus, comprising forming a first transistor and a capacitor on a first base substrate; forming a planarization layer on a side of the first transistor and the capacitor away from the first base substrate; forming a first via extending through the planarization layer; forming a first electrode on a side of the planarization layer away from the first base substrate, the first electrode connected to a first drain electrode and/or a second capacitor electrode through the first via; and forming a first passivation layer on a side of the first electrode away from the first base substrate; wherein forming the planarization layer comprises encapsulating the first transistor and the capacitor using an organic material having high hermeticity.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present disclosure provides, inter alia, an electronic printing system, a method of operating an electronic printing system, and a method of fabricating an imaging apparatus that substantially obviate one or more of the problems due to limitations and disadvantages of the related art. In one aspect, the present disclosure provides an electronic printing system. In some embodiments, the electronic printing system includes an imaging apparatus and an electronic paper that can be detached from each other and can be coupled together to perform one or more functionalities. Optionally, the imaging apparatus comprises a first electrode and a first passivation layer on the first electrode. Optionally, the electronic paper comprises a second electrode, an electro-optic layer on the second electrode, and a second passivation layer on a side of the electro-optic layer away from the second electrode. Optionally, when the imaging apparatus and the electronic paper are coupled together to perform at least one of the one or more functionalities, the first electrode, the first passivation layer, the second passivation layer, the electro-optic layer, and the second electrode are sequentially arranged in a stacked structure, the first electrode and the second electrode being configured to apply an electric field to the electro-optic layer. Optionally, the first passivation layer and the second passivation layer can be detached from each other.

Figure 1:
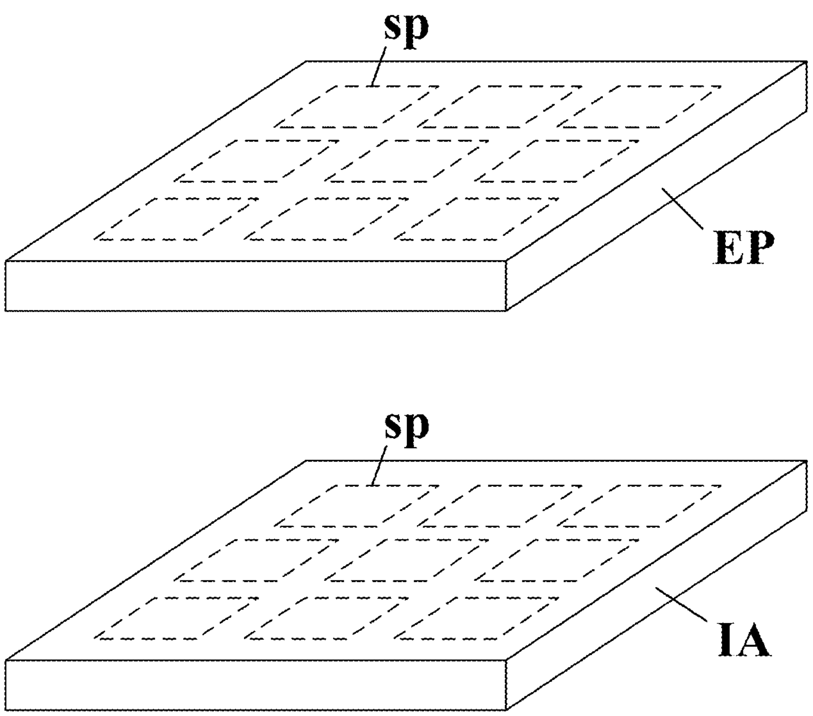
FIG. 1 is a schematic diagram illustrating the structure of an electronic printing system in some embodiments according to the present disclosure.

FIG. 1 is a schematic diagram illustrating the structure of an electronic printing system in some embodiments according to the present disclosure. Referring to FIG. 1, the electronic printing system in some embodiments includes an imaging apparatus IA and an electronic paper EP. In the present disclosure, the imaging apparatus IA and the electronic paper EP can be detached from each other and can be coupled together to perform one or more functionality. For example, any two layers respectively from the imaging apparatus IA and the electronic paper EP are not fixedly attached to each other, but adjacent layers respectively from the imaging apparatus IA and the electronic paper EP can be detachably coupled together for the purpose of performing one or more functionality such as printing, scanning, and resetting. In FIG. 1, a unit sp is labeled in the imaging apparatus IA and the electronic paper EP to indicate a correspondence relationship when the imaging apparatus IA and the electronic paper EP are coupled together.

In some embodiments, the electronic paper EP according to the present disclosure is a passive electronic paper. The electronic paper EP may be implemented in various scenarios. In one example, the electronic paper EP may be a coating on an object such as a vehicle. In another example, the electronic paper EP may be a reusable electronic paper that can be printed, erased, re-printed multiple times. In one example, the imaging apparatus may be a hand-held portable device. In another example, the imaging apparatus may be installed as a component of a printer, scanner, or multi-functional printing device, and the electronic paper EP may be a printable and/or scannable paper.

Figure 2:
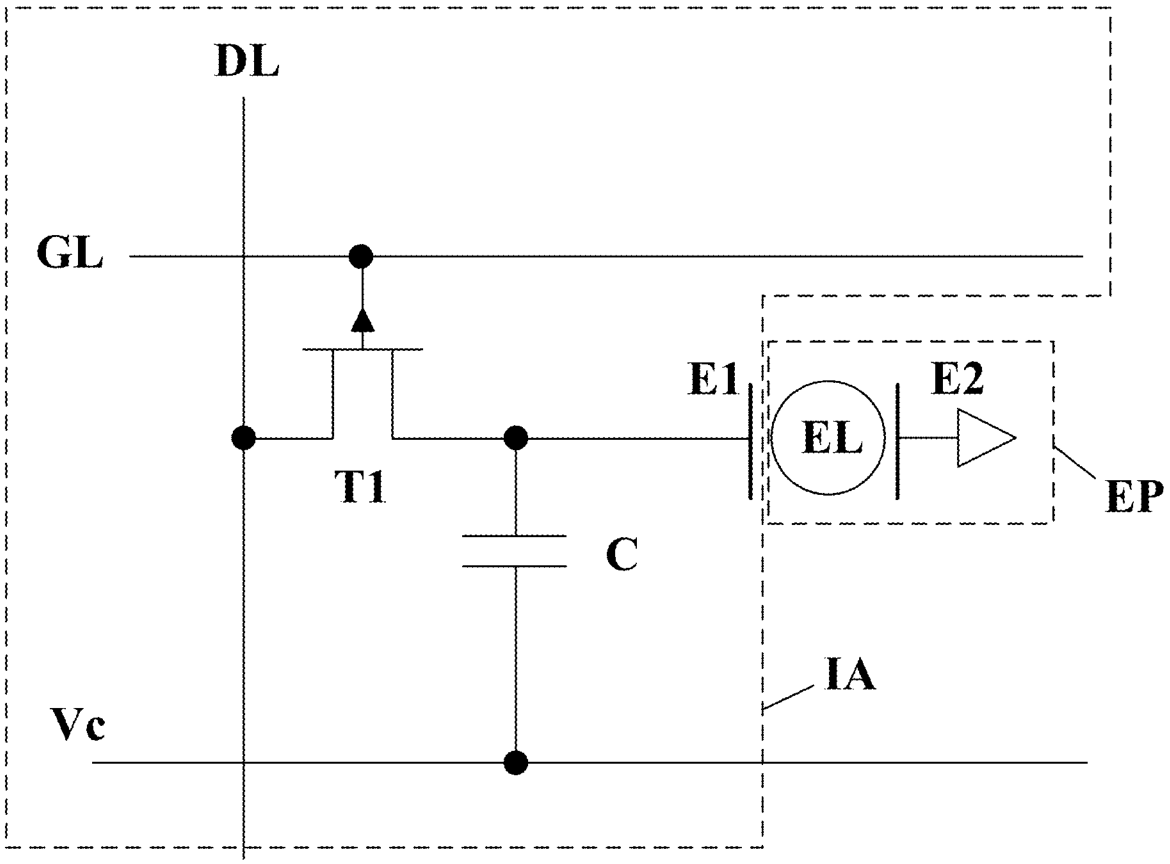
FIG. 2 is a circuit diagram illustrating the structure of a unit driving circuit driving an electronic printing system in some embodiments according to the present disclosure.

FIG. 2 is a circuit diagram illustrating the structure of a unit driving circuit driving an electronic printing system in some embodiments according to the present disclosure. Referring to FIG. 2, the unit driving circuit in some embodiments includes a first transistor T1, a capacitor C, a first electrode E1, an electro-optic layer EL, and a second electrode E2. Optionally, a gate electrode of the first transistor T1 is coupled to a gate line GL which is coupled to a gate driving integrated circuit, a first source electrode of the first transistor T1 is coupled to a data line DL which is coupled to a data driving integrated circuit, and a first drain electrode of the first transistor T1 is coupled to the first electrode E1 and a second capacitor electrode of the capacitor C. A first capacitor electrode of the capacitor C is coupled to a reference signal line Vc, and a second capacitor electrode of the capacitor C is coupled to the first electrode E1 and the first drain electrode of the first transistor T1. The first electrode E1 is coupled to the first drain electrode of the first transistor T1 and the second capacitor electrode of the capacitor C. The first electrode E1 and the second electrode E2 are configured to apply an electric field to the electro-optic layer EL.

In some embodiments, the electro-optic layer EL is an electrophoretic layer including a plurality of cell structures in which charged particles are moved according to an applied potential difference, for example, an applied potential difference between the first electrode E1 and the second electrode E2. Optionally, the electrophoretic layer is configured to display an image in an electrophoretic manner. Optionally, the electrophoretic layer is configured to display a color or monochrome image pattern through movement of particles according to an applied electric field, and may display an image through reflection or absorption of external light incident on the pattern. In one example, the electrophoretic layer may have a configuration in which cell structures (such as microcapsules, or a cup form) filled with a transparent fluid containing white and black particles, respectively. When the cell structures are between the first electrode E1 and the second electrode E2, the electrophoretic layer is configured to display a black or white image pattern by applying an electric field to each cell structure individually.

In some embodiments, a respective cell structure (e.g., a microcapsule or a partition structure of a cup form) includes particles of a first color (e.g., white particles) and particles of a second color (e.g., black particles). In one example, the white particles are positively charged, and the black particles are negatively charged such that the white particles and the black particles are moved in directions opposing to each other according to the applied electric field. In another example, the white particles are negatively charged, and the black particles are positively charged.

In some embodiments, the electro-optic layer EL is an electrowetting layer including a plurality of electrowetting elements.

In some embodiments, the electro-optic layer EL is an electrochromic layer including a plurality of electrochromic elements.

The unit driving circuit depicted in FIG. 2 is formed when the imaging apparatus IA and the electronic paper EP are placed adjacent to each other, e.g., in a printing process. FIG. 2 denotes portions of the unit driving circuit contributed by the imaging apparatus IA and portions of the unit driving circuit contributed by the electronic paper EP.

Figure 3:
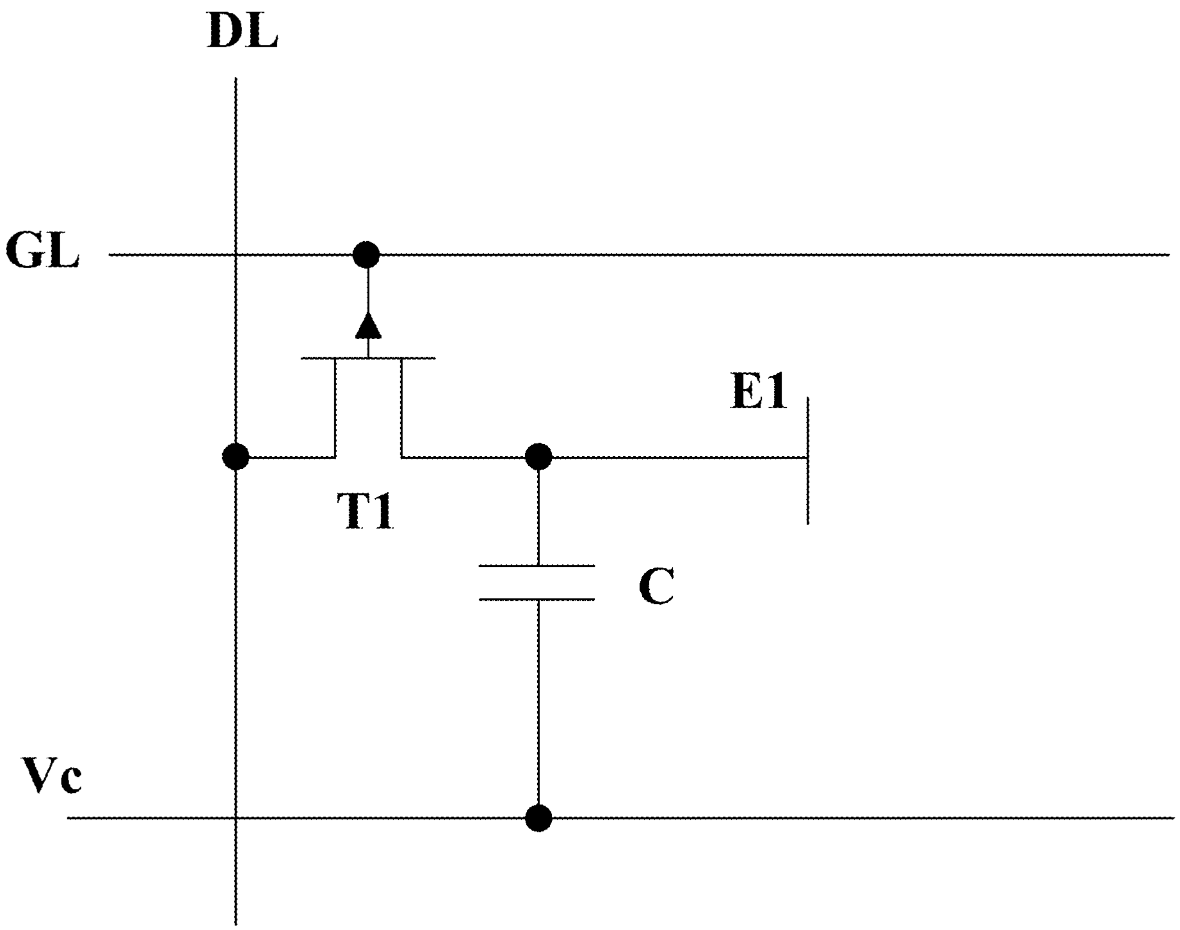
FIG. 3 is a circuit diagram illustrating the structure of a unit driving circuit driving an imaging apparatus in some embodiments according to the present disclosure.

FIG. 3 is a circuit diagram illustrating the structure of a driving circuit driving an imaging apparatus in some embodiments according to the present disclosure. Referring to FIG. 3, the driving circuit in some embodiments includes a first transistor T1, a capacitor C, and a first electrode E1. Optionally, a gate electrode of the first transistor T1 is coupled to a gate line GL which is coupled to a gate driving integrated circuit, a first source electrode of the first transistor T1 is coupled to a data line DL which is coupled to a data driving integrated circuit, and a first drain electrode of the first transistor T1 is coupled to the first electrode E1 and a second capacitor electrode of the capacitor C. A first capacitor electrode of the capacitor C is coupled to a reference signal line Vc, and a second capacitor electrode of the capacitor C is coupled to the first electrode E1 and the first drain electrode of the first transistor T1. The first electrode E1 is coupled to the first drain electrode of the first transistor T1 and the second capacitor electrode of the capacitor C.

Figure 4:
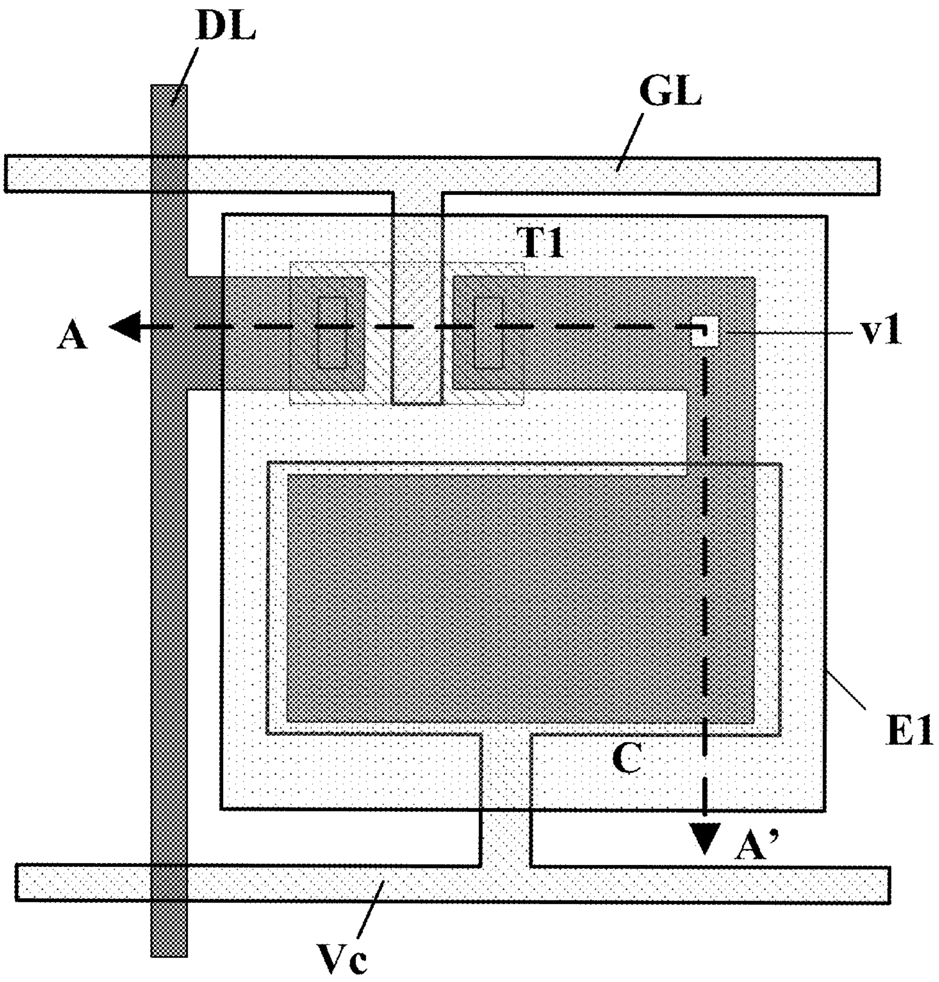
FIG. 4 is a plan view of a unit in an imaging apparatus in some embodiments according to the present disclosure.
Figure 5:
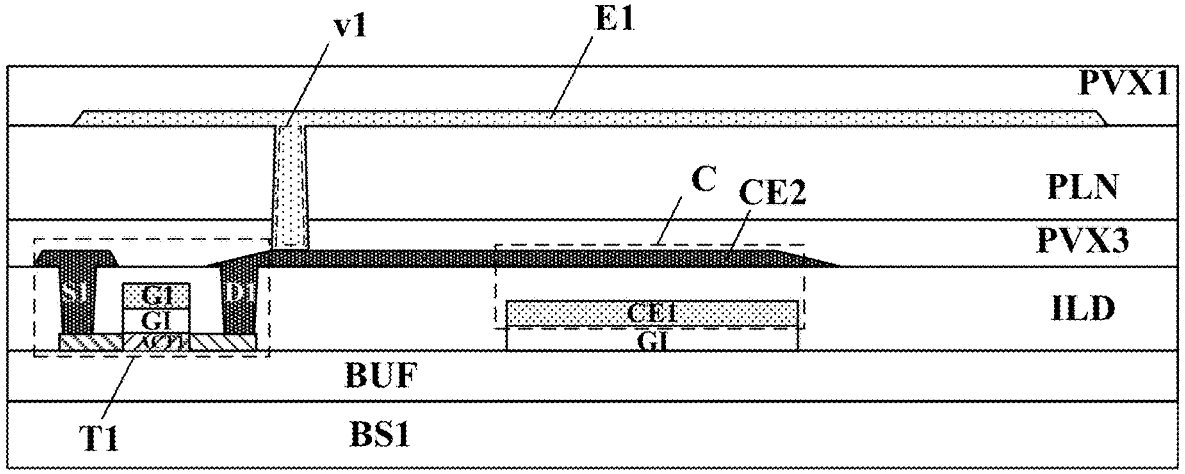
FIG. 5 is a cross-sectional view along an A-A' line in FIG. 4.

FIG. 4 is a plan view of a unit in an imaging apparatus in some embodiments according to the present disclosure. FIG. 5 is a cross-sectional view along an A-A' line in FIG. 4. Referring to FIG. 4 and FIG. 5, the unit in the imaging apparatus in some embodiments includes a first base substrate BS1; a buffer layer BUF on the first base substrate BS1; a first active layer ACT1 on a side of the buffer layer BUF away from the first base substrate BS1; a gate insulating layer GI on a side of the first active layer ACT1 away from the buffer layer BUF; a first gate electrode G1 on a side of the gate insulating layer GI away from the first active layer ACT1; a first capacitor electrode CE1 on a side of the gate insulating layer GI away from the buffer layer BUF; an inter-layer dielectric layer ILD on a side of the first gate electrode G1 and the first capacitor electrode CE1 away from the buffer layer BUF; a first source electrode S1, a first drain electrode D1, and a second capacitor electrode CE2 on a side of the inter-layer dielectric layer ILD away from the first base substrate BS1; a third passivation layer PVX3 on a side of the first source electrode S1, the first drain electrode D1, and the second capacitor electrode CE2 away from the first base substrate BS1; a planarization layer PLN on a side of the third passivation layer PVX3 away from the first base substrate BS1; a first electrode E1 on a side of the planarization layer PLN away from the first base substrate BS1; and a first passivation layer PVX1 on a side of the first electrode E1 away from the first base substrate BS1.

Optionally, the first source electrode S1 and the first drain electrode D1 extend through at least the inter-layer dielectric layer ILD to connect to the first active layer ACT1.

Optionally, the first drain electrode D1 is connected to the second capacitor electrode CE2. Optionally, the first drain electrode D1 and the second capacitor electrode CE2 are parts of a unitary structure.

Optionally, the imaging apparatus further includes a first via v1 extending through at least the planarization layer PLN and the third passivation layer PVX3. The first electrode E1 is connected to the first drain electrode and/or the second capacitor electrode CE2 through the first via v1.

Various appropriate insulating materials and various appropriate fabricating methods may be used to make the first passivation layer PVX1. For example, an insulating material may be deposited on the substrate by a plasma-enhanced chemical vapor deposition process or an atomic layer deposition process. Examples of materials suitable for making the first passivation layer PVX1 include, but are not limited to, silicon oxide (SiOy), silicon nitride (SiNy, e.g., $Si_3N_4$), silicon oxynitride ($SiO_xN_y$), graphene, and aluminum oxide ($Al_2O_3$).

In some embodiments, the first passivation layer PVX1 is formed to encapsulate the imaging apparatus. Because the present electronic printing system includes the imaging apparatus and the electronic paper that are separated from each other, the surface of the imaging apparatus and the electronic paper are formed with anti-scratch treatment. In one example, the first passivation layer PVX1 is formed using a multiple layer structure comprising sub-layers made of silicon oxide (SiOy), silicon nitride (SiNy, e.g., $Si_3N_4$), silicon oxynitride ($SiO_xN_y$), or graphene. In another example, the first passivation layer PVX1 is formed by an atomic layer deposition process to achieve enhanced mechanical characteristics.

Various appropriate electrode materials and various appropriate fabricating methods may be used to make the first electrode E1. For example, an electrode material may be deposited on the substrate by a plasma-enhanced chemical vapor deposition (PECVD) process. Metallic electrode materials and non-metallic electrode materials may be used for making the first electrode E1. Examples of appropriate metal electrode materials include, but are not limited to, a metal material and a graphene electrode material. Examples of appropriate metal electrode materials include, but are not limited to, copper, aluminum, silver, molybdenum, chromium, neodymium, nickel, manganese, titanium, tantalum, and tungsten. Examples of appropriate non-metal transparent electrode materials include, but are not limited to, various transparent metal oxide electrode materials and transparent nano-carbon tubes. Examples of transparent metal oxide materials include, but are not limited to, indium tin oxide, indium zinc oxide, indium gallium oxide, and indium gallium zinc oxide.

Figure 6A:
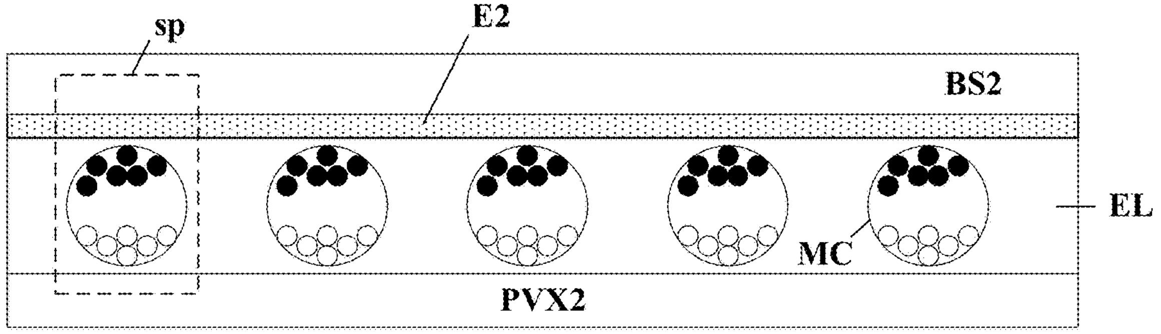
FIG. 6A is a cross-sectional view of an electronic paper in some embodiments according to the present disclosure.

FIG. 6A is a cross-sectional view of an electronic paper in some embodiments according to the present disclosure. Referring to FIG. 6A, the electronic paper in some embodiments includes a second base substrate BS2, a second electrode E2 on the second base substrate BS2, an electro-optic layer EL on a side of the second electrode E2 away from the second base substrate BS2, and a second passivation layer PVX2 on a side of the electro-optic layer EL away from the second electrode E2.

In the example depicted in FIG. 6A, the electro-optic layer EL includes a plurality of microcapsules MC (as cell structures). A respective microcapsule includes white particles and black particles, as discussed above. In the example depicted in FIG. 6A, a unit sp is denoted. In one example, the unit sp include a single microcapsule.

Figure 6B:
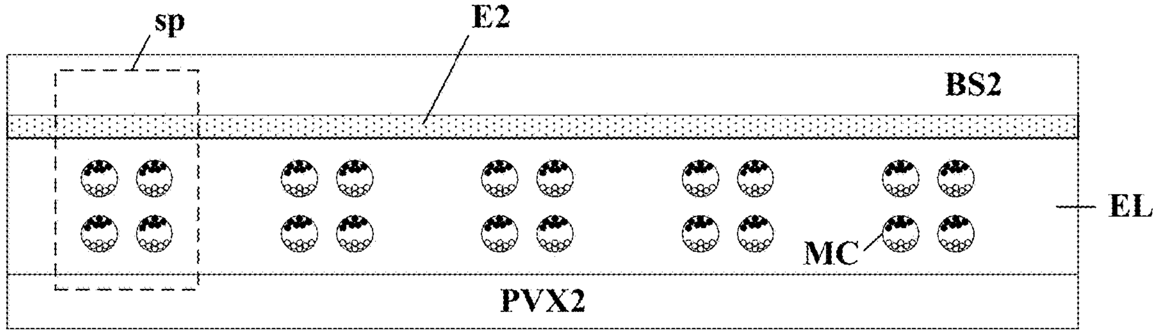
FIG. 6B is a cross-sectional view of an electronic paper in some embodiments according to the present disclosure.

FIG. 6B is a cross-sectional view of an electronic paper in some embodiments according to the present disclosure. Referring to FIG. 6B, in one example, the unit sp includes multiple microcapsules.

Various appropriate materials may be used for making the second base substrate BS2. Inorganic materials or organic materials may be used for forming the second base substrate BS2. Examples of materials suitable for making the second base substrate BS2 include glass, sapphire, quartz, polyimide, polyester, and metallic materials.

Various appropriate insulating materials and various appropriate fabricating methods may be used to make the second passivation layer PVX2. For example, an insulating material may be deposited on the substrate by a plasma-enhanced chemical vapor deposition process or an atomic layer deposition process. Examples of materials suitable for making the second passivation layer PVX2 include, but are not limited to, silicon oxide (SiOy), silicon nitride (SiNy, e.g., $Si_3N_4$), silicon oxynitride ($SiO_xN_y$), graphene, and aluminum oxide ($Al_2O_3$).

In some embodiments, the second passivation layer PVX2 from the electronic paper and the first passivation layer PVX1 from the imaging apparatus are disposed adjacent to each other (e.g., in direct contact with each other) during a printing process. Because the present electronic printing system includes the imaging apparatus and the electronic paper that are separated from each other, the surface of the imaging apparatus and the electronic paper are formed with anti-scratch treatment. In one example, the second passivation layer PVX2 is formed using a multiple layer structure comprising sub-layers made of silicon oxide (SiOy), silicon nitride (SiNy, e.g., $Si_3N_4$), silicon oxynitride ($SiO_xN_y$), or graphene. In another example, the second passivation layer PVX2 is formed by an atomic layer deposition process to achieve enhanced mechanical characteristics. Because the second passivation layer PVX2 is on the image viewing side of the electronic paper, the second passivation layer PVX2 may be formed using a substantially light transmissive material, e.g., a substantially transparent material having at least 50% (e.g., at least 60%, at least 70%, at least 80%, at least 90%, at least 95%, or at least 98%) light transmittance rate.

Various appropriate electrode materials and various appropriate fabricating methods may be used to make the second electrode E2. For example, an electrode material may be deposited on the substrate by a plasma-enhanced chemical vapor deposition (PECVD) process. Metallic electrode materials and non-metallic electrode materials may be used for making the second electrode E2. Examples of appropriate metal electrode materials include, but are not limited to, a metal material and a graphene electrode material. Examples of appropriate metal electrode materials include, but are not limited to, copper, aluminum, silver, molybdenum, chromium, neodymium, nickel, manganese, titanium, tantalum, and tungsten. Examples of appropriate non-metal transparent electrode materials include, but are not limited to, various transparent metal oxide electrode materials and transparent nano-carbon tubes. Examples of transparent metal oxide materials include, but are not limited to, indium tin oxide, indium zinc oxide, indium gallium oxide, and indium gallium zinc oxide.

Because the second electrode E2 in the present electronic paper is on a side of the second passivation layer PVX2 away from the viewing side of the electronic paper, the second electrode E2 may be formed using a non-transparent material such as a metallic material such as aluminum. Using a metallic material for making the second electrode E2 can decrease the IR drop in the second electrode E2.

Various appropriate implementations may be practiced to apply a voltage signal to the second electrode E2. For example, as shown in FIG. 6A and FIG. 6B, at least a portion of an edge of the second electrode E2 may be exposed, configured to be electrically connected to a signal line.

Figure 7A:
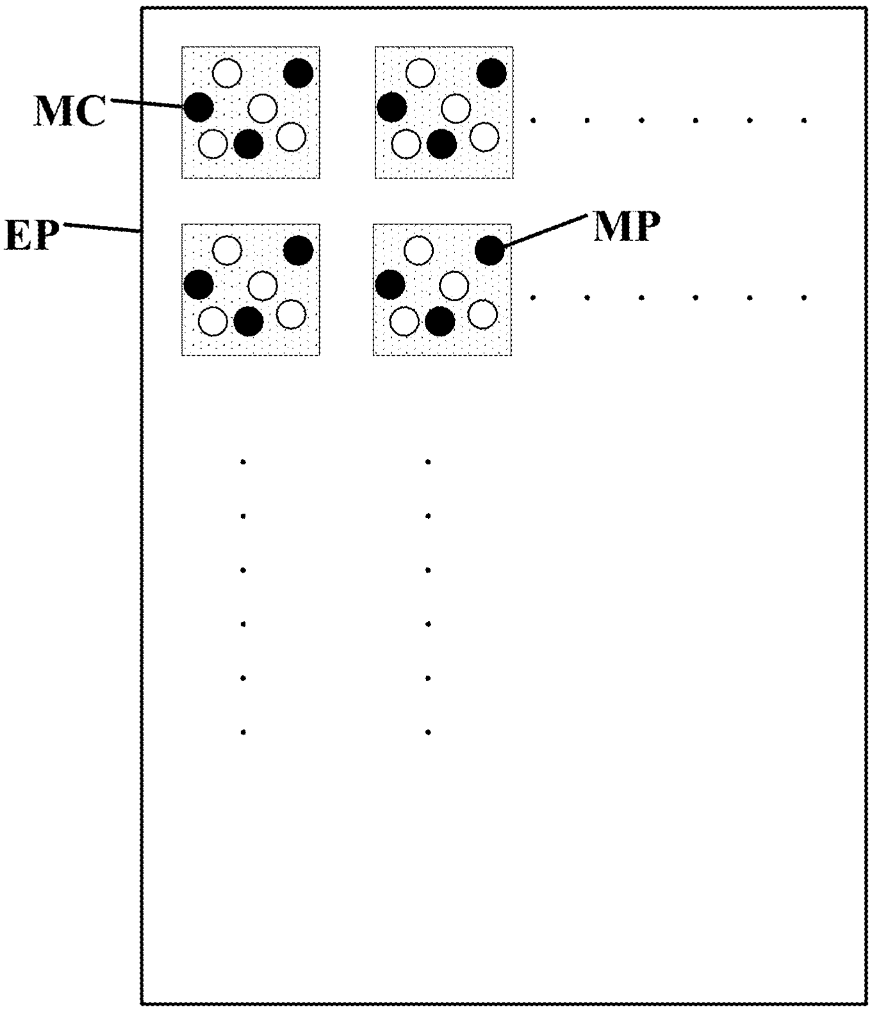
FIG. 7A is a plan view of an electronic paper in some embodiments according to the present disclosure.

FIG. 7A is a plan view of an electronic paper in some embodiments according to the present disclosure. Referring to FIG. 7A, the electronic paper EP in some embodiments includes a plurality of microcapsules MC. A respective microcapsule includes a plurality of microparticles MP. In the example depicted in FIG. 7A, a cross-section of the respective microcapsule has a rectangular or square shape.

Figure 7B:
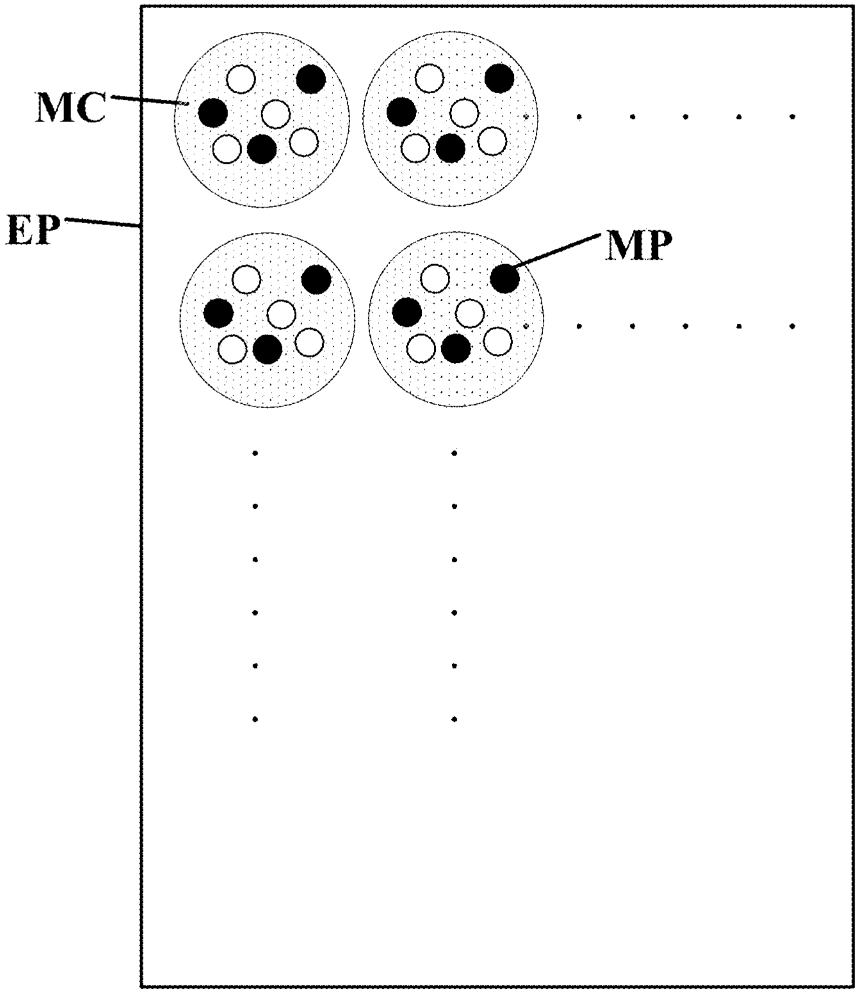
FIG. 7B is a plan view of an electronic paper in some embodiments according to the present disclosure.

FIG. 7B is a plan view of an electronic paper in some embodiments according to the present disclosure. In some embodiments, a cross-section of the respective microcapsule has a circular or elliptical shape.

Figure 8:
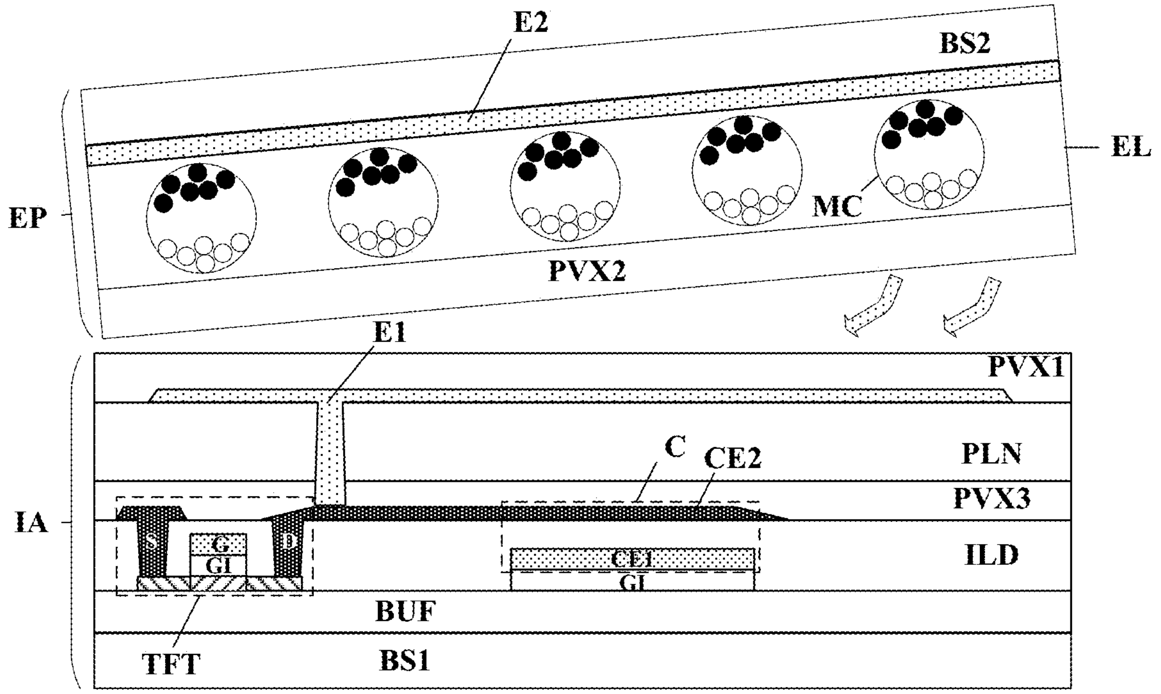
FIG. 8 illustrates an assembly process of an electronic printing system in some embodiments according to the present disclosure.
Figure 9:
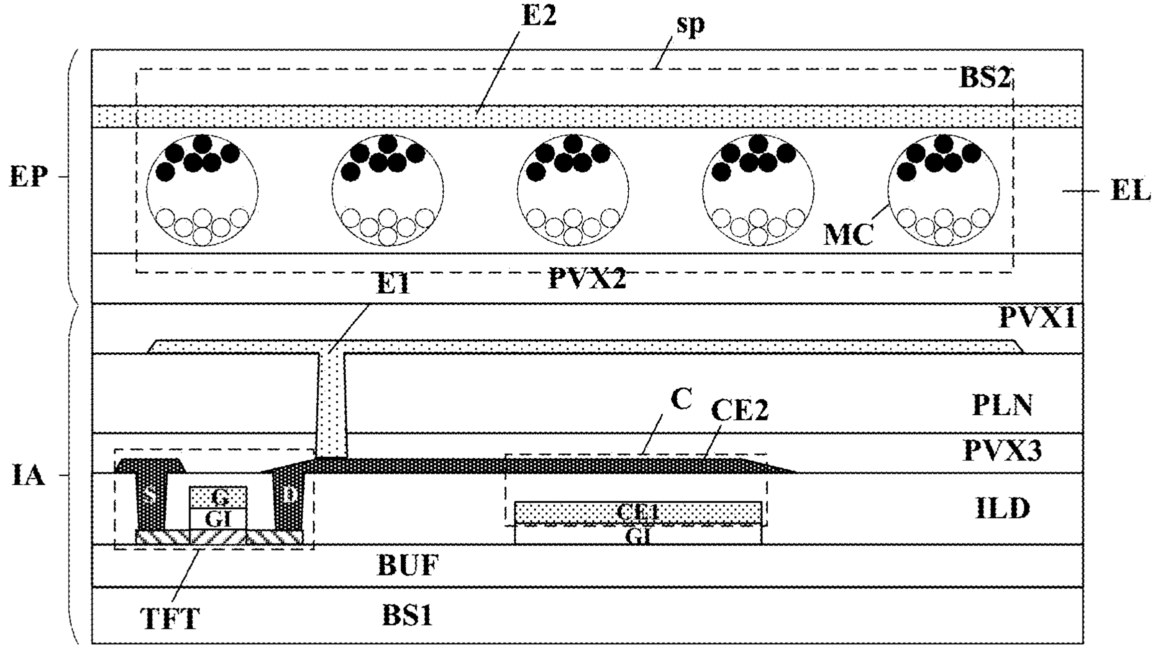
FIG. 9 is a schematic diagram illustrating the structure of an electronic printing system in some embodiments according to the present disclosure.

FIG. 8 illustrates an assembly process of an electronic printing system in some embodiments according to the present disclosure. Referring to FIG. 8 and FIG. 9, during a printing process, the imaging apparatus IA and the electronic paper EP are assembled in a manner so that the first passivation layer PVX1 is on a side of the first base substrate BS1 closer to the second passivation layer PVX2, and the second passivation layer PVX2 is on a side of the second base substrate BS2 closer to the first passivation layer PVX1. In the example depicted in FIG. 8, each first electrode corresponds to at least five microcapsules. As discussed above, the correspondence between the first electrode E1 and the number of microcapsules may vary, depending on the size of the unit, the size of the microcapsule, and the size of the first electrode E1.

FIG. 9 is a schematic diagram illustrating the structure of an electronic printing system in some embodiments according to the present disclosure. Referring to FIG. 9, in some embodiments, the electronic printing system assembled according to the present disclosure includes a first base substrate BS1; a buffer layer BUF on the first base substrate BS1; a first active layer ACT1 on a side of the buffer layer BUF away from the first base substrate BS1; a gate insulating layer GI on a side of the first active layer ACT1 away from the buffer layer BUF; a first gate electrode G1 on a side of the gate insulating layer GI away from the first active layer ACT1; a first capacitor electrode CE1 on a side of the gate insulating layer GI away from the buffer layer BUF; an inter-layer dielectric layer ILD on a side of the first gate electrode G1 and the first capacitor electrode CE1 away from the buffer layer BUF; a first source electrode S1, a first drain electrode D1, and a second capacitor electrode CE2 on a side of the inter-layer dielectric layer ILD away from the first base substrate BS1; a third passivation layer PVX3 on a side of the first source electrode S1, the first drain electrode D1, and the second capacitor electrode CE2 away from the first base substrate BS1; a planarization layer PLN on a side of the third passivation layer PVX3 away from the first base substrate BS1; a first electrode E1 on a side of the planarization layer PLN away from the first base substrate BS1; a first passivation layer PVX1 on a side of the first electrode E1 away from the first base substrate BS1; a second passivation layer PVX2 on a side of the first passivation layer PVX1 away from the first base substrate BS1; an electro-optic layer EL on a side of the second passivation layer PVX2 away from the first passivation layer PVX1; a second electrode E2 on a side of the electro-optic layer EL away from the second passivation layer PVX2; and a second base substrate BS2 on a side of the second electrode E2 away from the electro-optic layer EL.

As shown in FIG. 9, the first electrode E1 and the electro-optic layer EL are spaced apart by the first passivation layer PVX1 and the second passivation layer PVX2. The first passivation layer PVX1 and the second passivation layer PVX2 are not fixedly attached to each other, but movable relative to each other.

Figure 10:
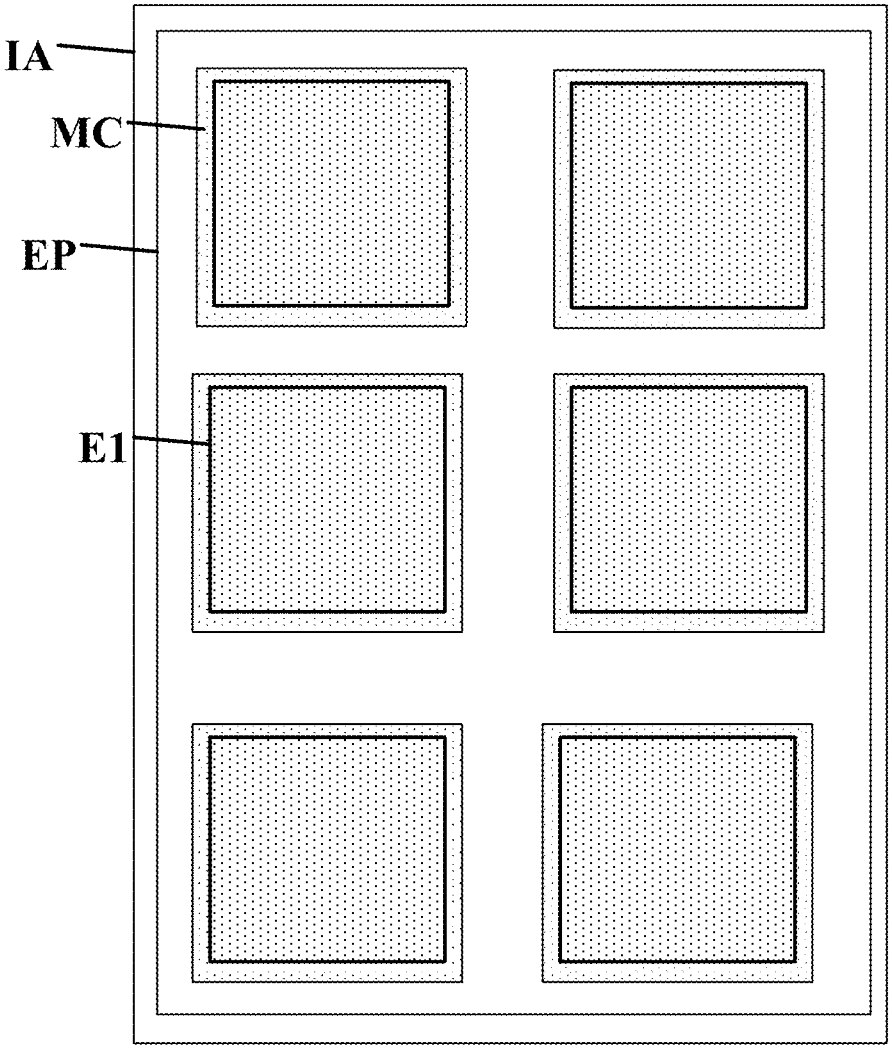
FIG. 10 is a plan view of an electronic printing system in some embodiments according to the present disclosure.

FIG. 10 is a plan view of an electronic printing system in some embodiments according to the present disclosure. In the example depicted in FIG. 10, each first electrode corresponds to a single microcapsule. As discussed above, the correspondence between the first electrode E1 and the number of microcapsules may vary, depending on the size of the unit, the size of the microcapsule, and the size of the first electrode E1. As shown in FIG. 10, an orthographic projection of the first electrode E1 on a base substrate at least partially overlaps with an orthographic projection of a respective microcapsule on the base substrate.

Referring to FIG. 10, in some embodiments, the imaging apparatus IA has a first size, the electronic paper EP has a second size. Optionally, the first size is greater than the second size. In one example, the imaging apparatus IA includes a position limiting structure that is configured to limit the position of the electronic paper EP when the imaging apparatus and the electronic paper are coupled together to perform at least one of the one or more functionalities. In another example, the imaging apparatus IA includes an alignment mark that is configured to facilitate an alignment between the electronic paper EP and the imaging apparatus IA when the imaging apparatus and the electronic paper are coupled together to perform at least one of the one or more functionalities.

In some embodiments, the imaging apparatus IA has a first active area, the electronic paper EP has a second area. As used herein, the term "active area" refers to a portion of the imaging apparatus IA or the electronic paper EP that contains components such as transistors, capacitors, and electrodes. In one example, the first active area is an area of the imaging apparatus IA having first electrodes, and the second active area is an area of the electronic paper EP having second electrodes. In one example, a size of the first active area is greater than a size of the second active area. In another example, a size of the first active area is substantially the same as a size of the second active area.

Figure 11:
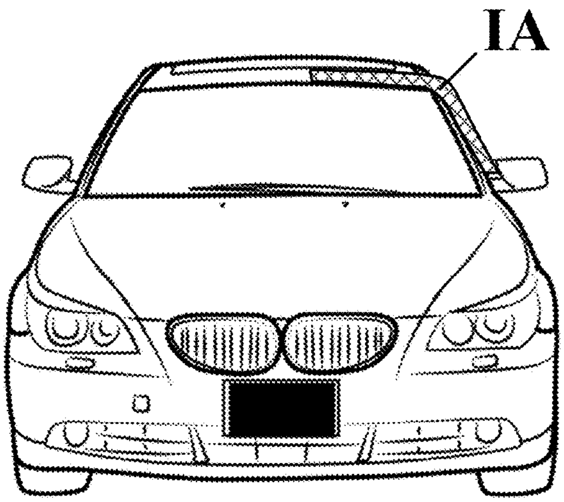
FIG. 11 illustrates a process of printing a coating of a vehicle using an electronic printing system in some embodiments according to the present disclosure.

As discussed above, the electronic paper may be implemented in various scenarios. In one example, the electronic paper may be a coating on an object such as a vehicle. In one example, the imaging apparatus may be a hand-held portable device. FIG. 11 illustrates a process of printing a coating of a vehicle using an electronic printing system in some embodiments according to the present disclosure. Referring to FIG. 11, in some embodiments, the electronic paper is a coating on a vehicle, and the imaging apparatus IA is a hand-held portable device. The imaging apparatus IA may be smaller than the electronic paper. For example, the imaging apparatus IA may be operated multiple times on the vehicle to complete a printing on the coating of the vehicle.

Figure 12:
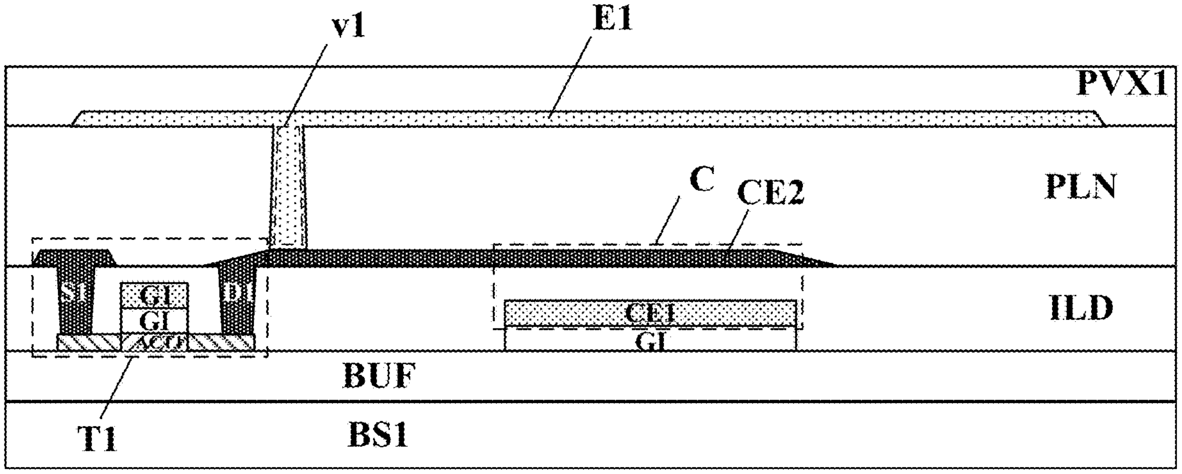
FIG. 12 is a cross-sectional view of an imaging apparatus in some embodiments according to the present disclosure.

Accordingly, the present disclosure provides a flexible imaging apparatus that is capable of conforming to a shape of the electronic paper (e.g., a shape of a portion of a vehicle). In some embodiments, the imaging apparatus is absent of an inorganic insulating layer. FIG. 12 is a cross-sectional view of an imaging apparatus in some embodiments according to the present disclosure. Referring to FIG. 12, the imaging apparatus in some embodiments includes a first base substrate BS1; a buffer layer BUF on the first base substrate BS1; a first active layer ACT1 on a side of the buffer layer BUF away from the first base substrate BS1; a gate insulating layer GI on a side of the first active layer ACT1 away from the buffer layer BUF; a first gate electrode G1 on a side of the gate insulating layer GI away from the first active layer ACT1; a first capacitor electrode CE1 on a side of the gate insulating layer GI away from the buffer layer BUF; an inter-layer dielectric layer ILD on a side of the first gate electrode G1 and the first capacitor electrode CE1 away from the buffer layer BUF; a first source electrode S1, a first drain electrode D1, and a second capacitor electrode CE2 on a side of the inter-layer dielectric layer ILD away from the first base substrate BS1; a planarization layer PLN on a side of the first source electrode S1, the first drain electrode D1, and the second capacitor electrode CE2 away from the inter-layer dielectric layer ILD; a first electrode E1 on a side of the planarization layer PLN away from the first base substrate BS1; and a first passivation layer PVX1 on a side of the first electrode E1 away from the first base substrate BS1.

Optionally, the first base substrate BS1 is made of a flexible material such as polyimide.

Optionally, the planarization layer PLN is made of an organic material having high hermeticity. As used herein, the term "hermeticity" refers to impermeability of a layer or an enclosed structure to air or moisture ingress. In one example, the hermeticity may be expressed as a measured helium flow rate through the layer or into the enclosed structure of less than $5\times10^{-8}$ atm-cc/sec, e.g., less than $4\times10^{-8}$ atm-cc/sec, less than $3\times10^{-8}$ atm-cc/sec, less than $2\times10^{-8}$ atm-cc/sec, or less than $1\times10^{-8}$ atm-cc/sec. Examples of organic insulating materials suitable for making the planarization layer PLN include paraxylene, silicone, polydimethylsiloxane, and phenolic resins. Optionally, the first passivation layer PVX1 is made of an organic material resistant to oxygen or moisture ingress.

Figure 13A:
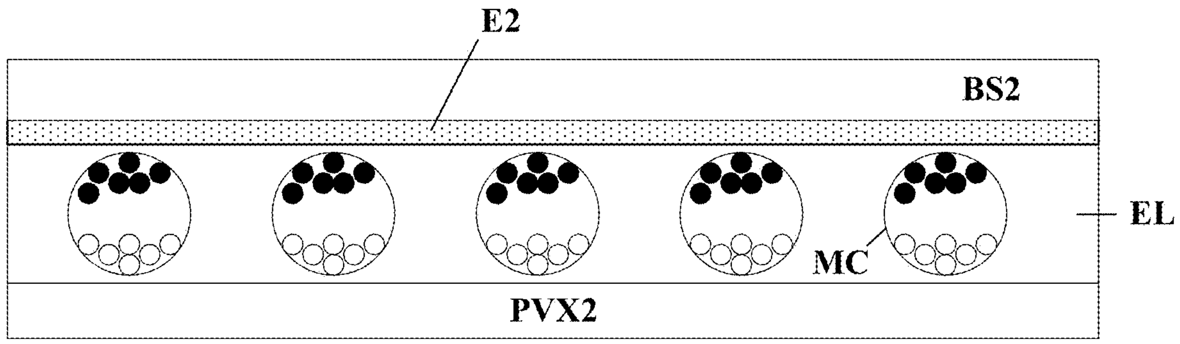
FIG. 13A is a cross-sectional view of an electronic paper in some embodiments according to the present disclosure.

Accordingly, the present disclosure provides a flexible electronic paper. FIG. 13A is a cross-sectional view of an electronic paper in some embodiments according to the present disclosure. Referring to FIG. 13A, in some embodiments, the second base substrate BS2 is made of a flexible organic material. Examples of appropriate organic materials for making the second base substrate BS2 include polyimide, poly(methyl methacrylate), organic glass, and other suitable organic flexible polymers.

In some embodiments, the second passivation layer PVX2 may be made of an organic material having high hermeticity to encapsulate the electronic paper. Examples of organic insulating materials suitable for making the second passivation layer PVX2 include paraxylene, silicone, polydimethylsiloxane, and phenolic resins. Moreover, the organic material for making the second passivation layer PVX2 may be a highly wear-resistant material.

Figure 13B:
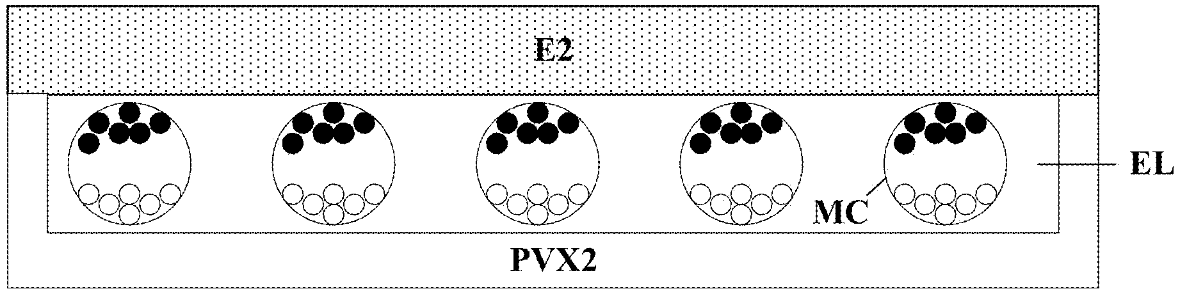
FIG. 13B is a cross-sectional view of an electronic paper in some embodiments according to the present disclosure.

FIG. 13B is a cross-sectional view of an electronic paper in some embodiments according to the present disclosure. Referring to FIG. 13B, the electronic paper in some embodiments includes a second electrode E2, an electro-optic layer EL on the second electrode E2, and a second passivation layer PVX2 on a side of the electro-optic layer EL away from the second electrode E2. Optionally, the second passivation layer PVX2 encapsulates the electro-optic layer EL on the second electrode E2. The electronic paper depicted in FIG. 13B is absent of a second base substrate. The second electrode E2 functions as a base substrate. In one example, the second electrode E2 is a metallic second electrode. In one particular example, the second electrode E2 is made of aluminum having a thickness of 0.1 mm. The metallic second electrode/base substrate has a relatively high malleability and high reflectivity. The electronic paper may easily conform to a shape of an object such as a vehicle, and may be used for making a coating of the vehicle. The electronic paper is also easily portable.

Figure 14:
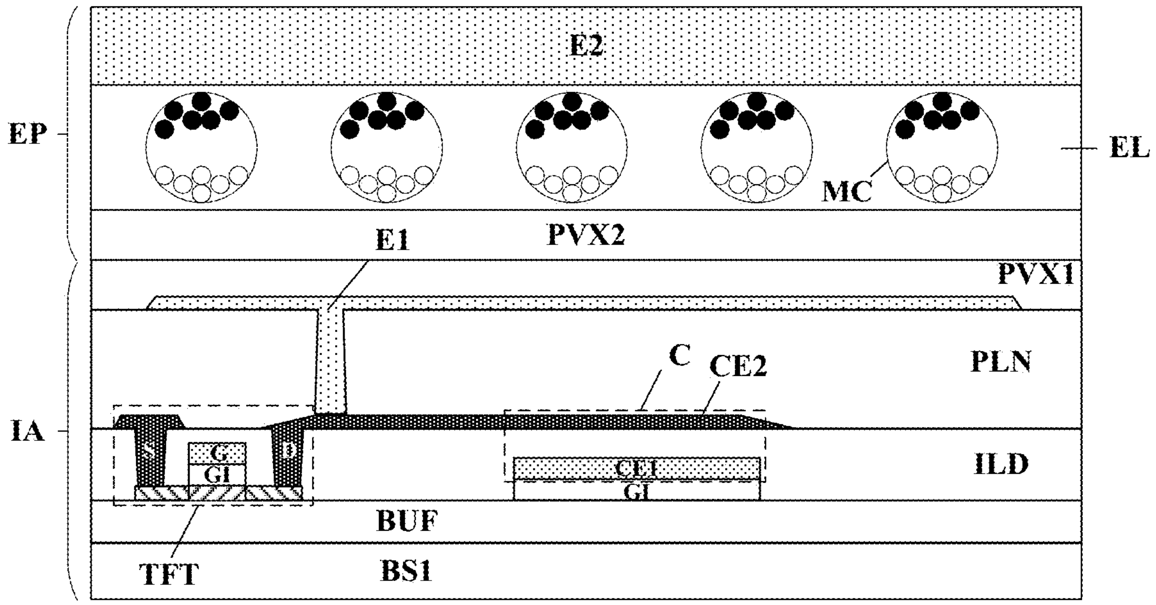
FIG. 14 is a schematic diagram illustrating the structure of an electronic printing system in some embodiments according to the present disclosure.

FIG. 14 is a schematic diagram illustrating the structure of an electronic printing system in some embodiments according to the present disclosure. FIG. 14 depicts an electronic printing system assembled using the imaging apparatus depicted in FIG. 12 and the electronic paper depicted in FIG. 13B according to the present disclosure. Referring to FIG. 14, the electronic printing system in some embodiments includes a first base substrate BS1; a buffer layer BUF on the first base substrate BS1; a first active layer ACT1 on a side of the buffer layer BUF away from the first base substrate BS1; a gate insulating layer GI on a side of the first active layer ACT1 away from the buffer layer BUF; a first gate electrode G1 on a side of the gate insulating layer GI away from the first active layer ACT1; a first capacitor electrode CE1 on a side of the gate insulating layer GI away from the buffer layer BUF; an inter-layer dielectric layer ILD on a side of the first gate electrode G1 and the first capacitor electrode CE1 away from the buffer layer BUF; a first source electrode S1, a first drain electrode D1, and a second capacitor electrode CE2 on a side of the inter-layer dielectric layer ILD away from the first base substrate BS1; a planarization layer PLN on a side of the first source electrode S1, the first drain electrode D1, and the second capacitor electrode CE2 away from the inter-layer dielectric layer ILD; a first electrode E1 on a side of the planarization layer PLN away from the first base substrate BS1; a first passivation layer PVX1 on a side of the first electrode E1 away from the first base substrate BS1; a second passivation layer PVX2 on a side of the first passivation layer PVX1 away from the first base substrate BS1; an electro-optic layer EL on a side of the second passivation layer PVX2 away from the first passivation layer PVX1; and a second electrode E2 on a side of the electro-optic layer EL away from the second passivation layer PVX2.

Figure 15A:
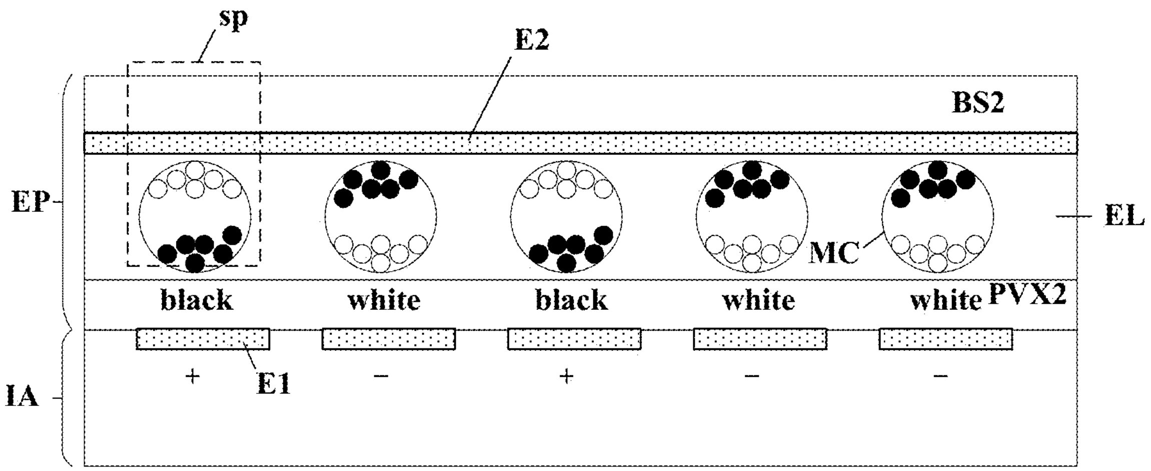
FIG. 15A illustrates a printing process using an electronic printing system according to the present disclosure.

In another aspect, the present disclosure provides a method of operating an electronic printing system. In some embodiments, the method includes providing an imaging apparatus and an electronic paper that can be detached from each other and can be coupled together to perform one or more functionalities; and assembling the imaging apparatus and the electronic paper so that a first electrode from the imaging apparatus and a second electrode from the electronic paper are capable of forming an electric field for driving an electro-optic layer in the electronic paper. For example, the imaging apparatus and the electronic paper are assembled so that the first electrode from the imaging apparatus and the second electrode from the electronic paper are close enough to form an electric field capable of driving the electro-optic layer. FIG. 15A illustrates a printing process using an electronic printing system according to the present disclosure. Referring to FIG. 2 and FIG. 15A, the method in some embodiments further includes turning on the first transistor T1 by an effective voltage of a gate driving signal provided by a gate line GL; allowing a data signal provided by a data line DL to pass through the first transistor T1, charging the capacitor C and the first electrode E1; applying an electric field formed by the first electrode E1 and the second electrode E2 to the electro-optic layer EL, thereby electronically printing an image on the electronic paper EP.

Referring to FIG. 15A, during the printing process, first electrodes respectively in multiple units may receive different data signals, charging the first electrodes differently. In the example depicted in FIG. 15A, a high voltage signal applied to an individual first electrode results in negatively charged black particles in an individual microcapsule in a same unit to move in a direction toward the individual first electrode, and positively charged white particles in the individual microcapsule in the same unit to move in a direction away from the individual first electrode. The unit is configured to display a black image.

A low voltage signal applied to an individual first electrode results in negatively charged black particles in an individual microcapsule in a same unit to move in a direction away from the individual first electrode, and positively charged white particles in the individual microcapsule in the same unit to move in a direction toward the individual first electrode. The unit is configured to display a white image.

Figure 15B:
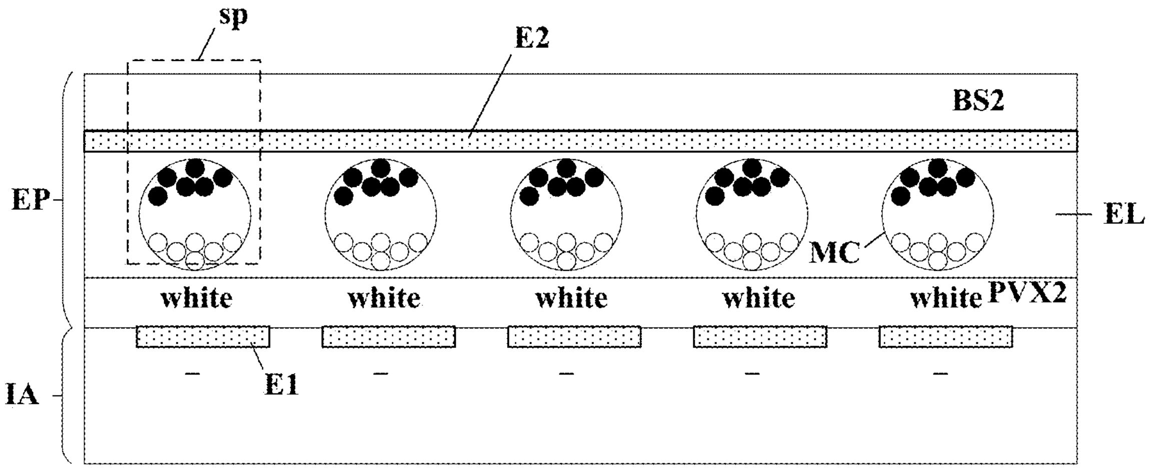
FIG. 15B illustrates a resetting process using an electronic printing system according to the present disclosure.

In some embodiments, the method further includes resetting the electronic paper to an initial state, for example, erasing a previous image electronically printed on the electronic paper. FIG. 15B illustrates a resetting process using an electronic printing system according to the present disclosure. Referring to FIG. 2 and FIG. 15B, a reset signal is provided through the data line DL to first electrodes respectively in all units of the imaging apparatus IA.

In one example, the reset signal is a negative voltage signal. Negatively charged black particles in an individual microcapsule in a same unit move in a direction away from the individual first electrode, and positively charged white particles in the individual microcapsule in the same unit move in a direction toward the individual first electrode. An entirety of the electronic paper is configured to display a white image, thereby resetting the electronic paper.

In another example, the reset signal is a positive voltage signal. Negatively charged black particles in an individual microcapsule in a same unit move in a direction toward the individual first electrode, and positively charged white particles in the individual microcapsule in the same unit move in a direction away from the individual first electrode. An entirety of the electronic paper is configured to display a black image, thereby resetting the electronic paper.

In some embodiments, the method further includes scanning an image displayed on the electronic paper. In one exemplary scenario, the electronic paper is annotated by a user, for example, using an electronic pen, a laser pen, or other appropriate input device. The annotated electronic paper may be conveniently scanned, and annotated information saved along with the original image.

Figure 15C:
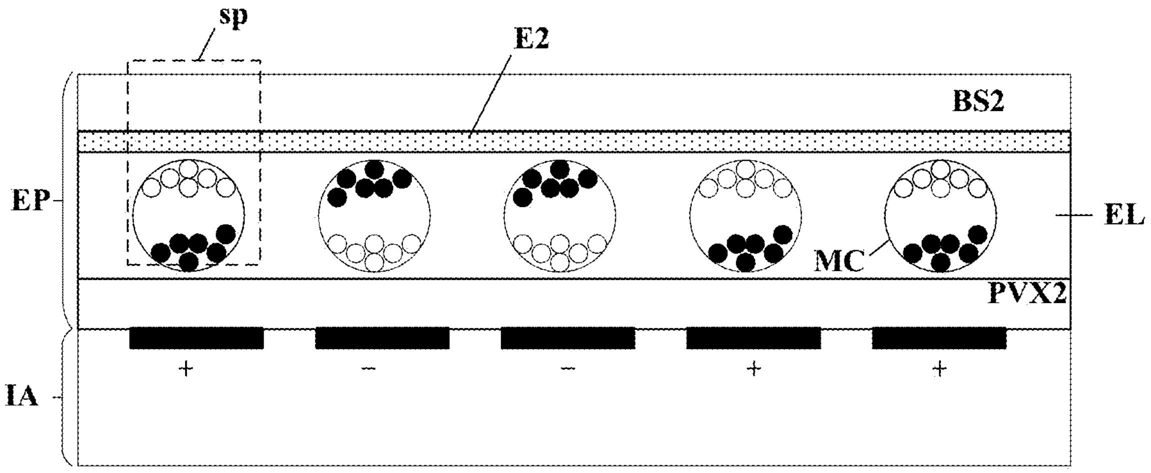
FIG. 15C illustrates a scanning process using an electronic printing system according to the present disclosure.

FIG. 15C illustrates a scanning process using an electronic printing system according to the present disclosure. Referring to FIG. 15C, the method in some embodiments further includes assembling the imaging apparatus and the electronic paper together so that the first electrode E1 from the imaging apparatus and the electro-optic layer EL from the electronic paper are close enough to induce a charge in the first electrode E1. The charge in the first electrode E1 is detected as a sensing signal, thereby detecting the image information displayed on the electronic paper.

In one example, a unit of the electronic paper displays a black image, with negatively charged black particles in an individual microcapsule on a side of positively charged white particles in the individual microcapsule closer to the first electrode E1. The negatively charged black particles in the individual microcapsule induce positive charges in the first electrode E1. A signal caused by the induced positive charges in the first electrode E1 is transmitted by a signal line to a detection integrated circuit.

In another example, a unit of the electronic paper displays a white image, with positively charged white particles in an individual microcapsule on a side of negatively charged black particles in the individual microcapsule closer to the first electrode E1. The positively charged white particles in the individual microcapsule induce negative charges in the first electrode E1. A signal caused by the induced negative charges in the first electrode E1 is transmitted by a signal line to a detection integrated circuit.

Referring to FIG. 2, FIG. 3, FIG. 14, and FIG. 15C, in some embodiments, prior to inducing a charge in the first electrode E1, the step of scanning an image displayed on the electronic paper further includes resetting the capacitor C; and applying a constant voltage signal to the second electrode E2.

In some embodiments, resetting the capacitor C includes resetting the second capacitor electrode of the capacitor C. Optionally, resetting the capacitor C includes turning on a transistor (e.g., the first transistor T1 in FIG. 2 or FIG. 3, or the second transistor T2 in FIG. 16, or both the first transistor T1 and the second transistor T2 in FIG. 16) connected to the second capacitor electrode of the capacitor C, allowing a reset voltage signal to pass the transistor to the second capacitor electrode of the capacitor C, thereby resetting to the capacitor C.

The plurality of microcapsules MC in the electronic paper EP have different grayscales. For example, the plurality of microcapsules MC in the electronic paper EP have different distributions of black particles and white particles depending on respective different grayscales. For example, in a microcapsule displaying a black image, negatively black particles are more concentrated on a side distal to the second electrode E2, and positively white particles are more concentrated on a side closer to the second electrode E2. In a microcapsule displaying a white image, positively white particles are more concentrated on a side distal to the second electrode E2, and negatively black particles are more concentrated on a side closer to the second electrode E2. Because the plurality of microcapsules MC in the electronic paper EP have different distributions of black particles and white particles, the plurality of microcapsules MC in the electronic paper EP have different capacitance. A respective second electrode in the electronic paper EP and a corresponding first electrode in the imaging apparatus IM form an equivalent capacitor.

The second capacitor electrode of the capacitor C is connected to the corresponding first electrode in the imaging apparatus IM, and has a same voltage level as a voltage level at the corresponding first electrode. When a constant voltage signal is applied to the second electrode E2, a charge is induced in the corresponding first electrode. Because the second capacitor electrode of the capacitor C is connected to the corresponding first electrode, the capacitor C is charged when the constant voltage signal is applied to the second electrode E2. Different amounts of charges may be induced in equivalent capacitors respectively between respective second electrodes in different units of the electronic paper EP and corresponding first electrodes in different units of the imaging apparatus IM, due to different grayscales and different distributions of charged particles in different microcapsules respectively in different units of the electronic paper EP. Different amounts of charges may be induced in equivalent capacitors results in different amounts of charges induced in second capacitor electrodes of capacitors respectively in different units of the imaging apparatus IM.

Subsequently, in some embodiments, second transistors respectively in different units of the imaging apparatus are turned on one-by-one, allows signals corresponding to induced charges respectively in second capacitor electrodes of capacitors respectively in different units of the imaging apparatus IA to be read by an integrated circuit, e.g., through read lines. Signals corresponding to induced charges respectively in second capacitor electrodes of capacitors respectively in different units of the imaging apparatus IA correspond to different grayscales in different microcapsules in the electronic paper EP. The image displayed on the electronic paper is thereby scanned by the imaging apparatus IA.

In some embodiments, applying a constant voltage signal to the second electrode E2 is performed for a duration greater than a threshold duration. Optionally, the threshold duration is a response time of the charged particles (e.g., the negatively charged black particles and/or the positively charged white particles). In one example, the response time is 1 second, and the threshold duration is 1 second. Optionally, the constant voltage signal has a voltage level greater than a threshold voltage level, for example, a voltage level capable of flipping the charged particles. In one example, the threshold voltage level is 20 V.

In one example, the constant voltage signal has a voltage level of approximately 3 V. This voltage level is sufficient for scanning an image displayed on an electronic paper of a relatively small size, e.g., a 2.04 inch or 2.9 inch electronic paper. In another example, the constant voltage signal has a voltage level of approximately 5 V. This voltage level is sufficient for scanning an image displayed on an electronic paper of a medium size, e.g., a 3.5 inch, 4.3 inch, 6.0 inch, or 8.0 inch electronic paper. In another example, the constant voltage signal has a voltage level of approximately 10 to 20 V. This voltage level is sufficient for scanning an image displayed on an electronic paper of a relatively larger size, e.g., a 14 inch electronic paper (e.g., an A4 size electronic paper). Moreover, different types of microcapsules require different voltage levels for the constant voltage signal. For a particular type of microcapsule, the voltage level required by be greater than 110 V.

The inventors of the present disclosure discover that it is critical to apply the constant voltage signal to the second electrode E2 for a duration greater than the response time of the charged particles. The inventors of the present disclosure discover that, only when the duration is greater than the response time of the charged particles, the grayscale of the microcapsule can be fully read, and the image displayed on the electronic paper can be accurately scanned.

Figure 16:
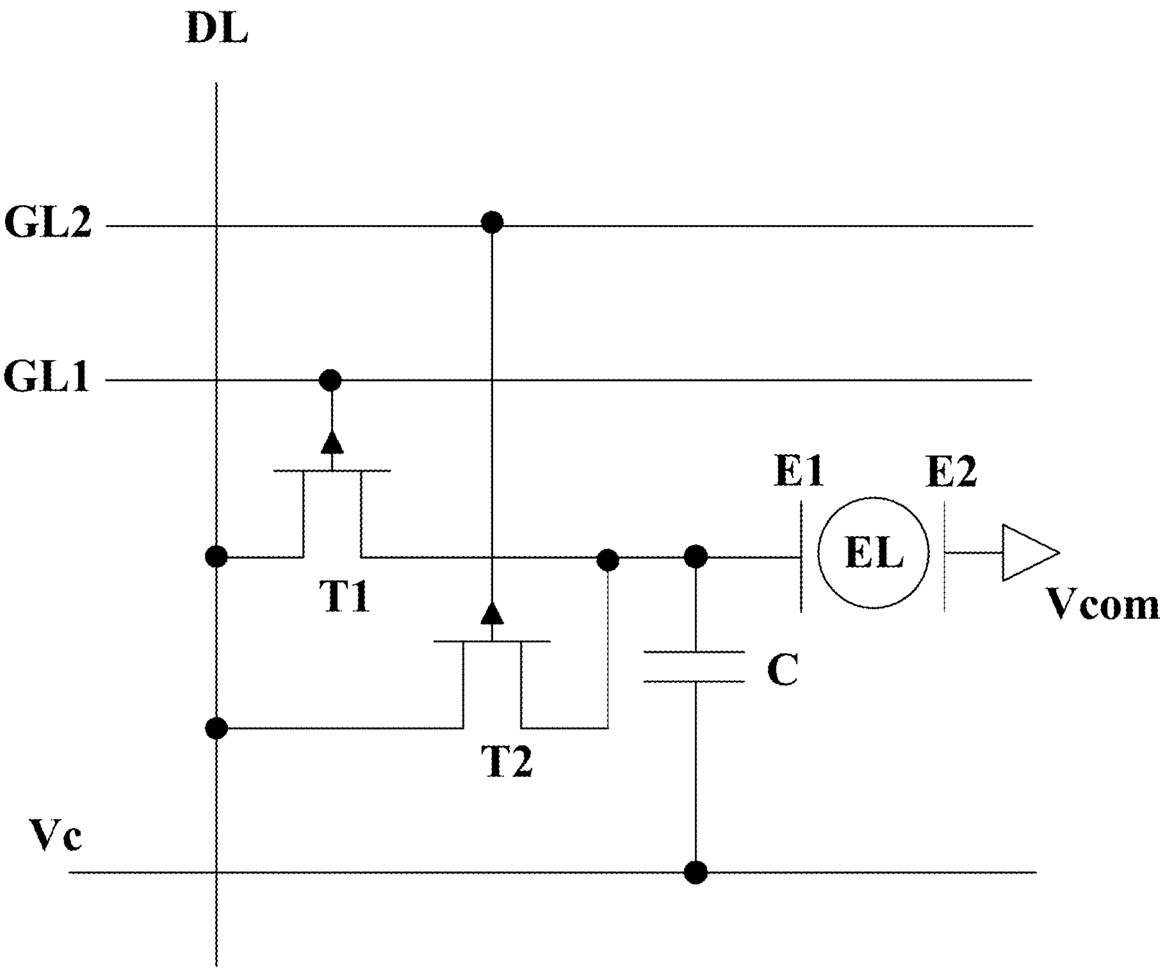
FIG. 16 is a circuit diagram illustrating the structure of a unit driving circuit driving an electronic printing system in some embodiments according to the present disclosure.

FIG. 16 is a circuit diagram illustrating the structure of a unit driving circuit driving an electronic printing system in some embodiments according to the present disclosure. Referring to FIG. 16, the unit driving circuit in some embodiments includes a first transistor T1, a second transistor T2, a capacitor C, a first electrode E1, an electro-optic layer EL, and a second electrode E2. Optionally, a gate electrode of the first transistor T1 is coupled to a first gate line GL1 which is coupled to a gate driving integrated circuit, a first source electrode of the first transistor T1 is coupled to a data line DL which is coupled to a data driving integrated circuit, and a first drain electrode of the first transistor T1 is coupled to the first electrode E1 and a second capacitor electrode of the capacitor C. Optionally, a gate electrode of the second transistor T2 is coupled to a second gate line GL2 which is coupled to the gate driving integrated circuit, a second source electrode of the second transistor T2 is coupled to the data line DL, and a second drain electrode of the second transistor T2 is coupled to the first electrode E1 and the second capacitor electrode of the capacitor C. A first capacitor electrode of the capacitor C is coupled to a reference signal line Vc, and a second capacitor electrode of the capacitor C is coupled to the first electrode E1, the first drain electrode of the first transistor T1, and the second drain electrode of the second transistor T2. The first electrode E1 is coupled to the first drain electrode of the first transistor T1, the second drain electrode of the second transistor T2, and the second capacitor electrode of the capacitor C.

The unit driving circuit depicted in FIG. 16 is formed when the imaging apparatus and the electronic paper are placed adjacent to each other, e.g., in a printing process, a resetting process, or a scanning process.

Figure 17:
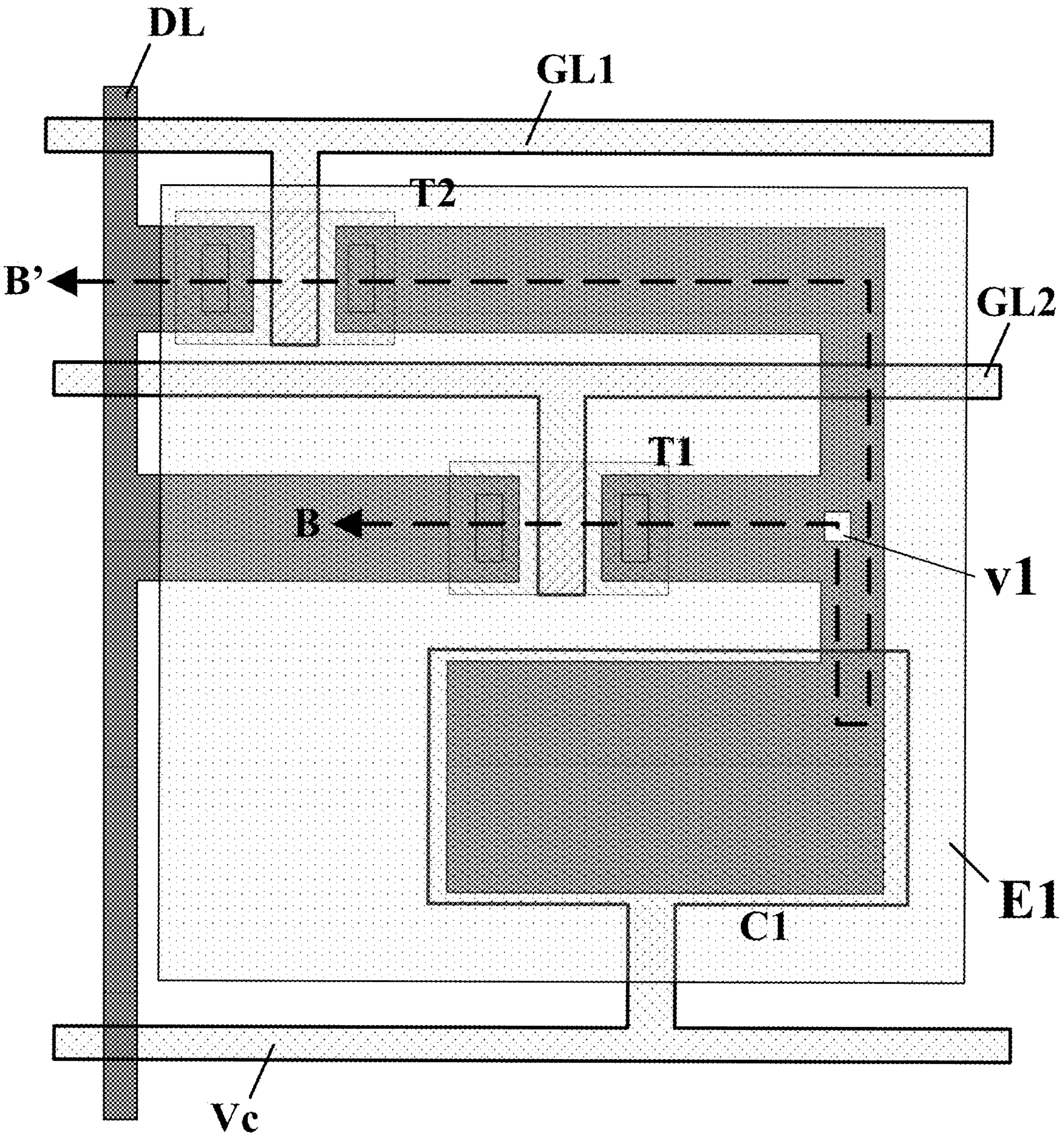
FIG. 17 is a plan view of a unit in an imaging apparatus in some embodiments according to the present disclosure.
Figure 18:
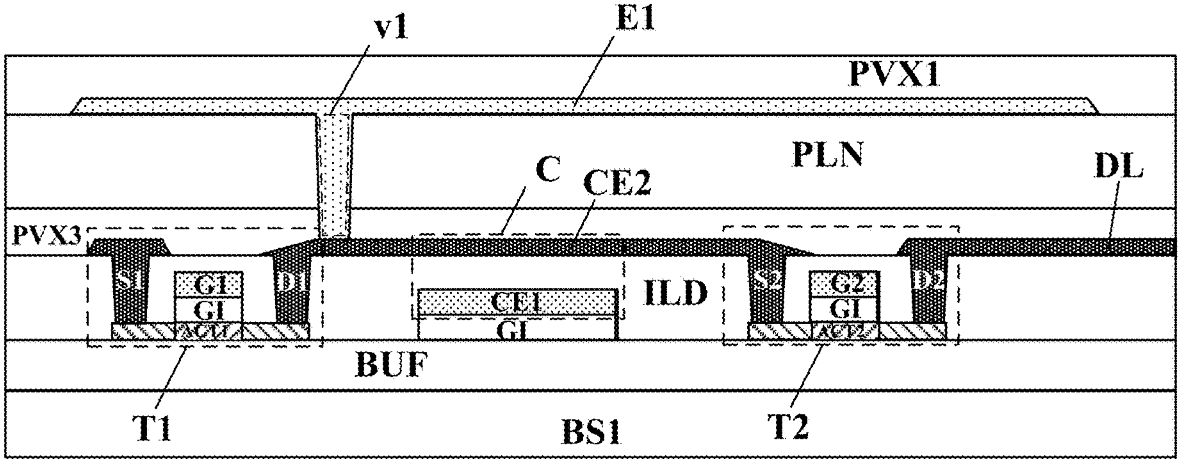
FIG. 18 is a cross-sectional view along a B-B' line in FIG. 17.

FIG. 17 is a plan view of a unit in an imaging apparatus in some embodiments according to the present disclosure. FIG. 18 is a cross-sectional view along a B-B' line in FIG. 17. Referring to FIG. 17 and FIG. 18, the unit in the imaging apparatus in some embodiments includes a first base substrate BS1; a buffer layer BUF on the first base substrate BS1; a first active layer ACT1 and a second active layer ACT2 on a side of the buffer layer BUF away from the first base substrate BS1; a gate insulating layer GI on a side of the first active layer ACT1 and the second active layer ACT2 away from the buffer layer BUF; a first gate electrode G1 on a side of the gate insulating layer GI away from the first active layer ACT1, and a second gate electrode G2 on a side of the gate insulating layer GI away from the second active layer ACT2; a first capacitor electrode CE1 on a side of the gate insulating layer GI away from the buffer layer BUF; an inter-layer dielectric layer ILD on a side of the first gate electrode G1, the second gate electrode G2, and the first capacitor electrode CE1 away from the buffer layer BUF; a first source electrode S1, a first drain electrode D1, a second source electrode S2, a second drain electrode D2, and a second capacitor electrode CE2 on a side of the inter-layer dielectric layer ILD away from the first base substrate BS1; a third passivation layer PVX3 on a side of the first source electrode S1, the first drain electrode D1, the second source electrode S2, the second drain electrode D2, and the second capacitor electrode CE2 away from the first base substrate BS1; a planarization layer PLN on a side of the third passivation layer PVX3 away from the first base substrate BS1; a first electrode E1 on a side of the planarization layer PLN away from the first base substrate BS1; and a first passivation layer PVX1 on a side of the first electrode E1 away from the first base substrate BS1.

Optionally, the first source electrode S1 and the first drain electrode D1 extend through at least the inter-layer dielectric layer ILD to connect to the first active layer ACT1.

Optionally, the second source electrode S2 and the second drain electrode D2 extend through at least the inter-layer dielectric layer ILD to connect to the second active layer ACT1.

Optionally, the first drain electrode D1 is connected to the second capacitor electrode CE2. Optionally, the second source electrode S2 is connected to the second capacitor electrode CE2. Optionally, the first drain electrode D1, the second source electrode S2, and the second capacitor electrode CE2 are parts of a unitary structure.

In some embodiments, the electronic printing system is a multi-functional system that is capable of printing an image on the electronic paper or scanning an image from the electronic paper.

Referring to FIG. 16 to FIG. 18, during a printing process, the method in some embodiments includes turning on the first transistor T1 by an effective voltage of a first gate driving signal provided by a first gate line GL1; allowing a data signal provided by a data line DL to pass through the first transistor T1, charging the capacitor C and the first electrode E1; applying an electric field formed by the first electrode E1 and the second electrode E2 to the electro-optic layer EL, thereby electronically printing an image on the electronic paper EP. During the printing process, the second transistor T2 may be turned off by an ineffective voltage of a second gate driving signal provided by a second gate line GL2. During the printing process, the data line DL is configured to transmit data signals.

Referring to FIG. 16 to FIG. 18, during a scanning process, the method in some embodiments includes turning on the second transistor T2 by an effective voltage of a second gate driving signal provided by a second gate line GL2, inducing a charge on the first electrode E1 by the electron-optic layer EL in the electronic paper, transmitting a signal caused by the charge on the first electrode E1 through the second transistor T2 and the data line DL to a detection integrated circuit. During the scanning process, the first transistor T1 may be turned off by an ineffective voltage of the first gate driving signal provided by the first gate line GL1. During the scanning process, the data line DL is not configured to transmit data signals, but configured to transmit the signal caused by the charge on the first electrode E1 induced by the electron-optic layer EL.

In some embodiments, different units in the electronic paper having different grayscales are configured to induce different amounts of charges in respective corresponding units in the imaging apparatus. The signals caused by the charges induced in the respective corresponding units in the imaging apparatus are stored in the detection integrated circuit. Optionally, the detection integrated circuit and the data driving integrated circuit are integrated together.

Figure 19:
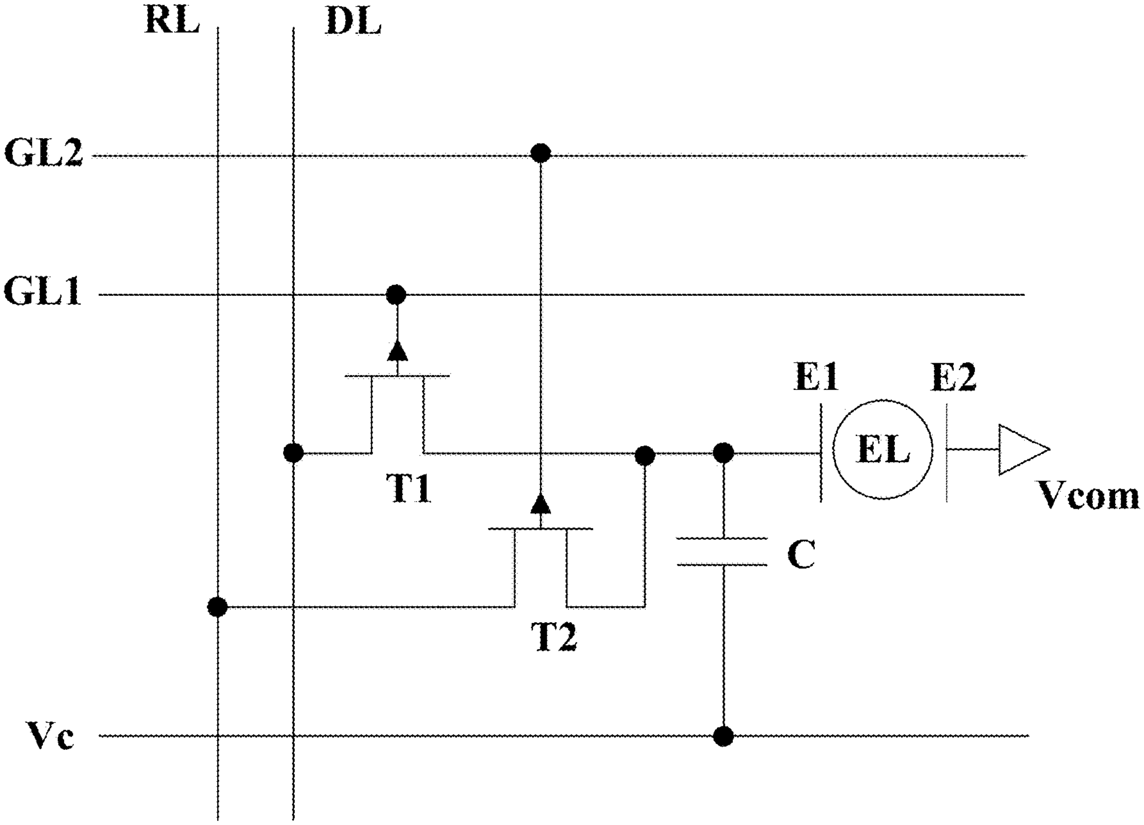
FIG. 19 is a circuit diagram illustrating the structure of a unit driving circuit driving an electronic printing system in some embodiments according to the present disclosure.

FIG. 19 is a circuit diagram illustrating the structure of a unit driving circuit driving an electronic printing system in some embodiments according to the present disclosure. Referring to FIG. 19, the unit driving circuit in some embodiments includes a first transistor T1, a second transistor T2, a capacitor C, a first electrode E1, an electro-optic layer EL, and a second electrode E2. Optionally, a gate electrode of the first transistor T1 is coupled to a first gate line GL1 which is coupled to a gate driving integrated circuit, a first source electrode of the first transistor T1 is coupled to a data line DL which is coupled to a data driving integrated circuit, and a first drain electrode of the first transistor T1 is coupled to the first electrode E1 and a second capacitor electrode of the capacitor C. Optionally, a gate electrode of the second transistor T2 is coupled to a second gate line GL2 which is coupled to the gate driving integrated circuit, a second source electrode of the second transistor T2 is coupled to a read line RL, and a second drain electrode of the second transistor T2 is coupled to the first electrode E1 and the second capacitor electrode of the capacitor C. A first capacitor electrode of the capacitor C is coupled to a reference signal line Vc, and a second capacitor electrode of the capacitor C is coupled to the first electrode E1, the first drain electrode of the first transistor T1, and the second drain electrode of the second transistor T2. The first electrode E1 is coupled to the first drain electrode of the first transistor T1, the second drain electrode of the second transistor T2, and the second capacitor electrode of the capacitor C.

The unit driving circuit depicted in FIG. 19 is formed when the imaging apparatus and the electronic paper are placed adjacent to each other, e.g., in a printing process, a resetting process, or a scanning process.

Figure 20:
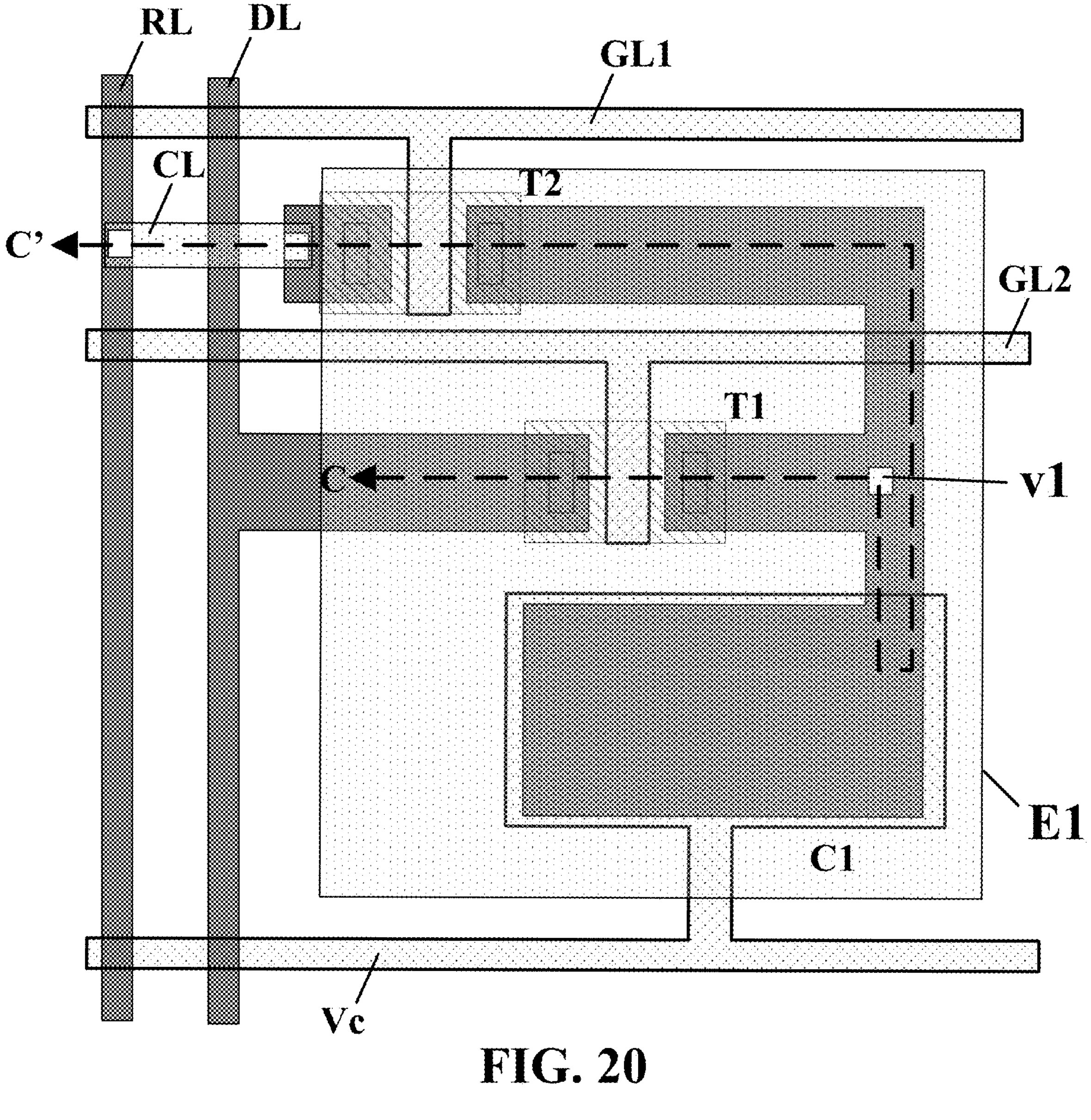
FIG. 20 is a plan view of a unit in an imaging apparatus in some embodiments according to the present disclosure.
Figure 21:
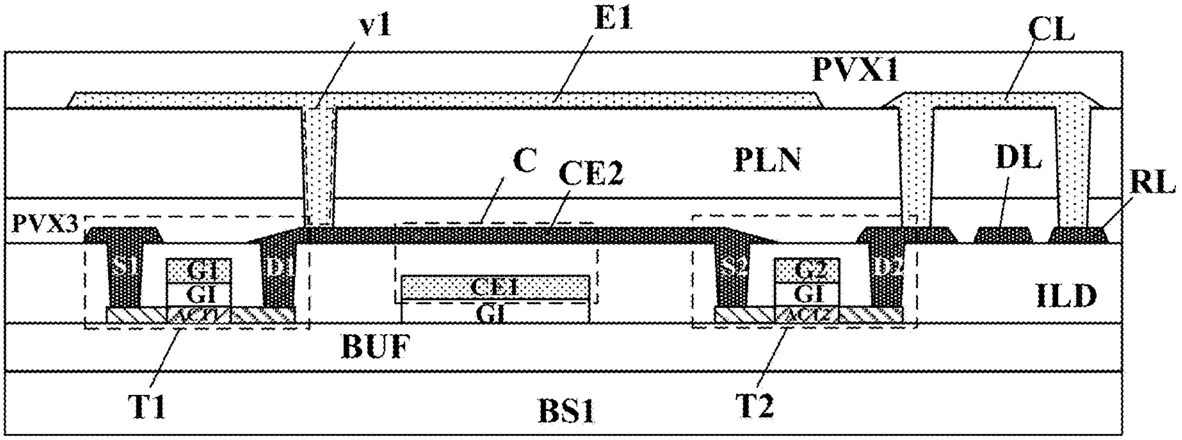
FIG. 21 is a cross-sectional view along a C-C' line in FIG. 20.

FIG. 20 is a plan view of a unit in an imaging apparatus in some embodiments according to the present disclosure. FIG. 21 is a cross-sectional view along a C-C' line in FIG. 20. Referring to FIG. 20 and FIG. 21, the unit in the imaging apparatus in some embodiments includes a first base substrate BS1; a buffer layer BUF on the first base substrate BS1; a first active layer ACT1 and a second active layer ACT2 on a side of the buffer layer BUF away from the first base substrate BS1; a gate insulating layer GI on a side of the first active layer ACT1 and the second active layer ACT2 away from the buffer layer BUF; a first gate electrode G1 on a side of the gate insulating layer GI away from the first active layer ACT1, and a second gate electrode G2 on a side of the gate insulating layer GI away from the second active layer ACT2; a first capacitor electrode CE1 on a side of the gate insulating layer GI away from the buffer layer BUF; an inter-layer dielectric layer ILD on a side of the first gate electrode G1, the second gate electrode G2, and the first capacitor electrode CE1 away from the buffer layer BUF; a first source electrode S1, a first drain electrode D1, a second source electrode S2, a second drain electrode D2, and a second capacitor electrode CE2 on a side of the inter-layer dielectric layer ILD away from the first base substrate BS1; a third passivation layer PVX3 on a side of the first source electrode S1, the first drain electrode D1, the second source electrode S2, the second drain electrode D2, and the second capacitor electrode CE2 away from the first base substrate BS1; a planarization layer PLN on a side of the third passivation layer PVX3 away from the first base substrate BS1; a first electrode E1 and a connecting line CL on a side of the planarization layer PLN away from the first base substrate BS1; and a first passivation layer PVX1 on a side of the first electrode E1 and the connecting line CL away from the first base substrate BS1. The connecting line CL connects the second drain electrode D2 of the second transistor T2 to the read line RL.

Optionally, the first source electrode S1 and the first drain electrode D1 extend through at least the inter-layer dielectric layer ILD to connect to the first active layer ACT1.

Optionally, the second source electrode S2 and the second drain electrode D2 extend through at least the inter-layer dielectric layer ILD to connect to the second active layer ACT1.

Optionally, the first drain electrode D1 is connected to the second capacitor electrode CE2. Optionally, the second source electrode S2 is connected to the second capacitor electrode CE2. Optionally, the first drain electrode D1, the second source electrode S2, and the second capacitor electrode CE2 are parts of a unitary structure.

Optionally, the connecting line CL extends through at least one of the planarization layer PLN or the third passivation layer PVX3 to connect to the second drain electrode of the second transistor T2, and extends through at least one of the planarization layer PLN or the third passivation layer PVX3 to connect to the read line RL.

Figure 22:
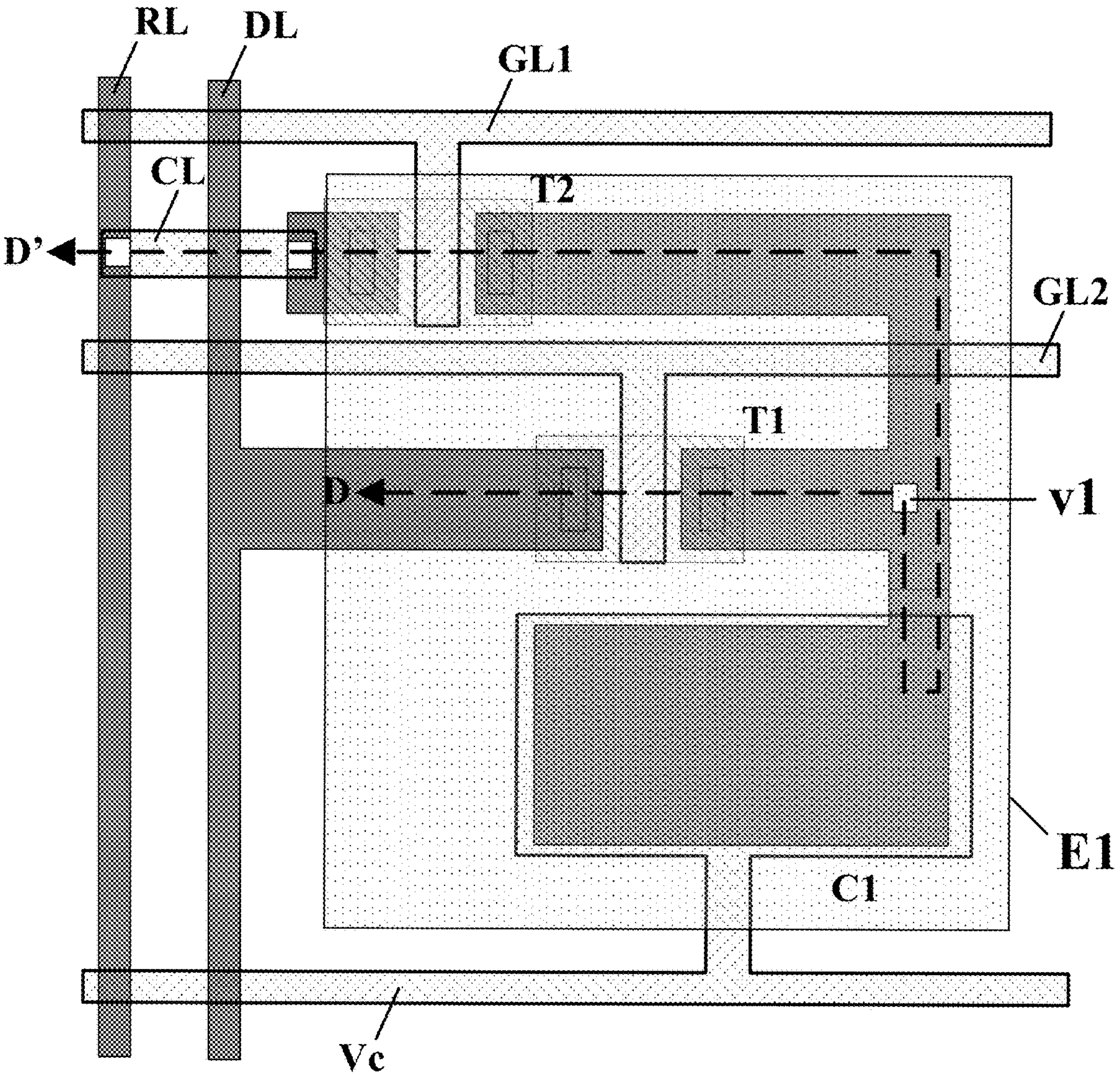
FIG. 22 is a plan view of a unit in an imaging apparatus in some embodiments according to the present disclosure.
Figure 23:
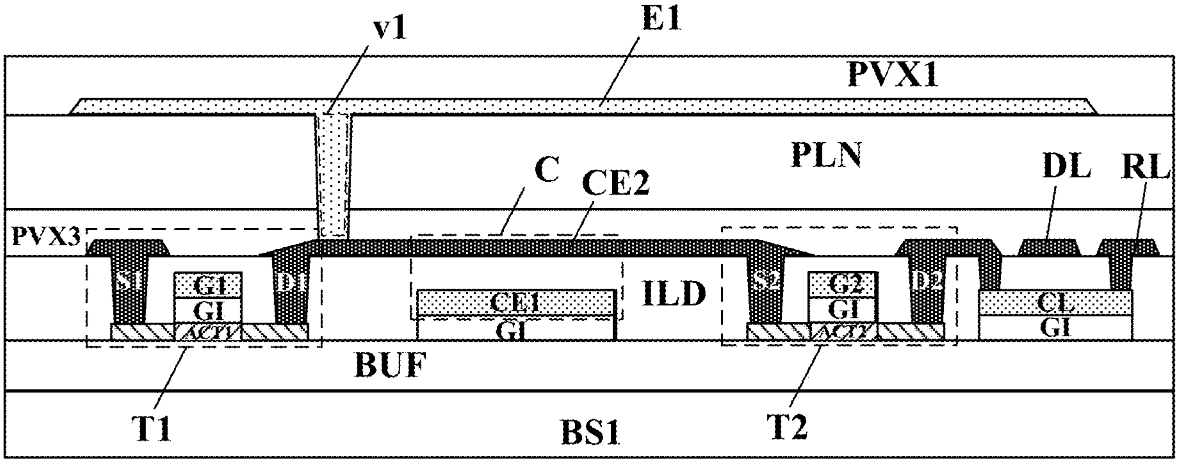
FIG. 23 is a cross-sectional view along a D-D' line in FIG. 22.

FIG. 22 is a plan view of a unit in an imaging apparatus in some embodiments according to the present disclosure. FIG. 23 is a cross-sectional view along a D-D' line in FIG. 22. the unit in the imaging apparatus in some embodiments includes a first base substrate BS1; a buffer layer BUF on the first base substrate BS1; a first active layer ACT1 and a second active layer ACT2 on a side of the buffer layer BUF away from the first base substrate BS1; a gate insulating layer GI on a side of the first active layer ACT1 and the second active layer ACT2 away from the buffer layer BUF; a first gate electrode G1 on a side of the gate insulating layer GI away from the first active layer ACT1, and a second gate electrode G2 on a side of the gate insulating layer GI away from the second active layer ACT2; a first capacitor electrode CE1 on a side of the gate insulating layer GI away from the buffer layer BUF; an inter-layer dielectric layer ILD on a side of the first gate electrode G1, the second gate electrode G2, and the first capacitor electrode CE1 away from the buffer layer BUF; a first source electrode S1, a first drain electrode D1, a second source electrode S2, a second drain electrode D2, a second capacitor electrode CE2, and a connecting line CL on a side of the inter-layer dielectric layer ILD away from the first base substrate BS1; a third passivation layer PVX3 on a side of the first source electrode S1, the first drain electrode D1, the second source electrode S2, the second drain electrode D2, the second capacitor electrode CE2, and the connecting line CL away from the first base substrate BS1; a planarization layer PLN on a side of the third passivation layer PVX3 away from the first base substrate BS1; a first electrode E1 on a side of the planarization layer PLN away from the first base substrate BS1; and a first passivation layer PVX1 on a side of the first electrode E1 away from the first base substrate BS1. The connecting line CL connects the second drain electrode D2 of the second transistor T2 to the read line RL.

Optionally, the first source electrode S1 and the first drain electrode D1 extend through at least the inter-layer dielectric layer ILD to connect to the first active layer ACT1.

Optionally, the second source electrode S2 and the second drain electrode D2 extend through at least the inter-layer dielectric layer ILD to connect to the second active layer ACT1.

Optionally, the first drain electrode D1 is connected to the second capacitor electrode CE2. Optionally, the second source electrode S2 is connected to the second capacitor electrode CE2. Optionally, the first drain electrode D1, the second source electrode S2, and the second capacitor electrode CE2 are parts of a unitary structure.

Optionally, the second drain electrode D1 extends through at least the inter-layer dielectric layer ILD to connect to the connecting line CL. Optionally, the read line RL extends through at least the inter-layer dielectric layer ILD to connect to the connecting line CL.

In some embodiments, the electronic printing system is a multi-functional system that is capable of printing an image on the electronic paper or scanning an image from the electronic paper.

Referring to FIG. 19 to FIG. 23, during a printing process, the method in some embodiments includes turning on the first transistor T1 by an effective voltage of a first gate driving signal provided by a first gate line GL1; allowing a data signal provided by a data line DL to pass through the first transistor T1, charging the capacitor C and the first electrode E1; applying an electric field formed by the first electrode E1 and the second electrode E2 to the electro-optic layer EL, thereby electronically printing an image on the electronic paper EP. During the printing process, the second transistor T2 may be turned off by an ineffective voltage of a second gate driving signal provided by a second gate line GL2. During the printing process, the data line DL is configured to transmit data signals.

Referring to FIG. 19 to FIG. 23, during a scanning process, the method in some embodiments includes turning on the second transistor T2 by an effective voltage of a second gate driving signal provided by a second gate line GL2, inducing a charge on the first electrode E1 by the electron-optic layer EL in the electronic paper, transmitting a signal caused by the charge on the first electrode E1 through the second transistor T2 and the read line RL to a detection integrated circuit. During the scanning process, the first transistor T1 may be turned off by an ineffective voltage of the first gate driving signal provided by the first gate line GL1. During the scanning process, the data line DL is not configured to transmit data signals, but configured to transmit the signal caused by the charge on the first electrode E1 induced by the electron-optic layer EL.

In some embodiments, different units in the electronic paper having different grayscales are configured to induce different amounts of charges in respective corresponding units in the imaging apparatus. The signals caused by the charges induced in the respective corresponding units in the imaging apparatus are stored in the detection integrated circuit.

Figure 24:
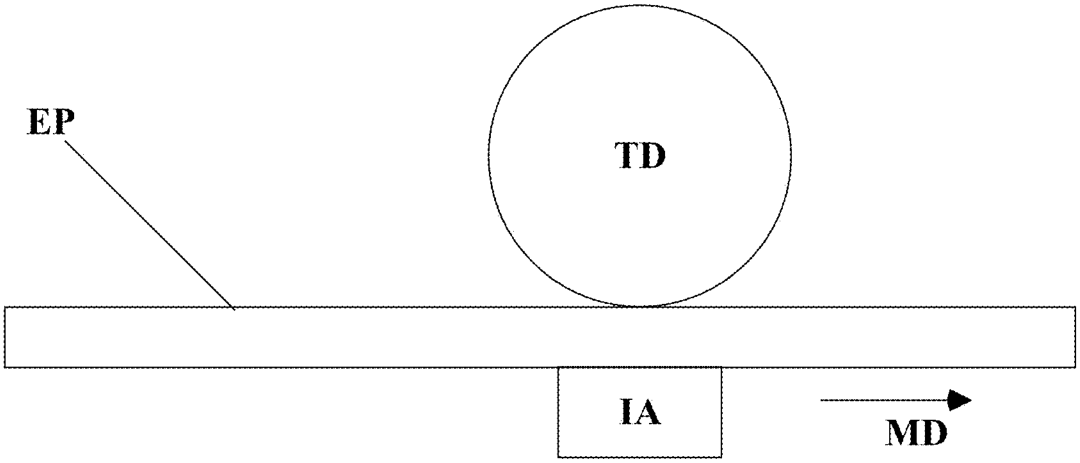
FIG. 24 illustrates an operation of an electronic printing system in some embodiments according to the present disclosure.
Figure 25A:
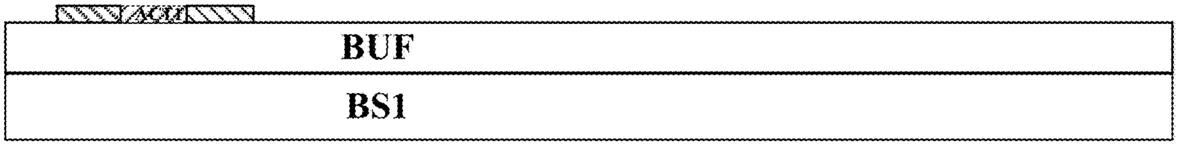
FIG. 25A to FIG. 25E illustrate a process of fabricating an imaging apparatus in some embodiments according to the present disclosure.
Figure 25B:
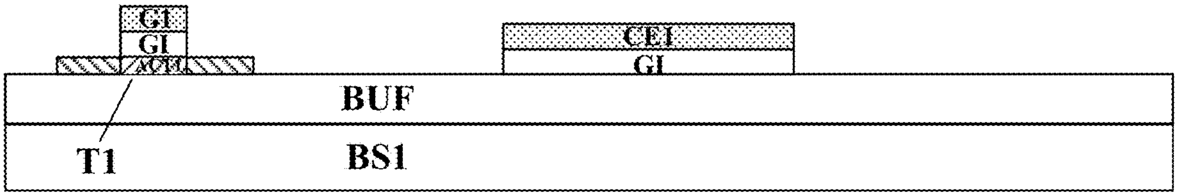
Figure 25C:
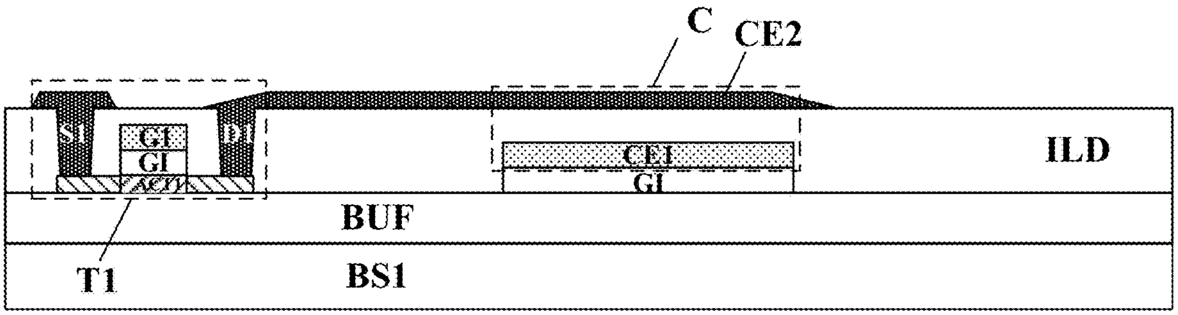
Figure 25D:
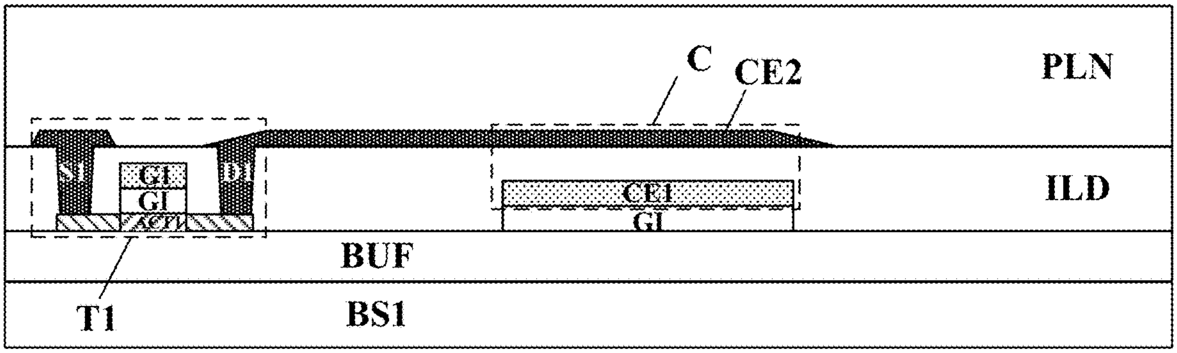
Figure 25E:
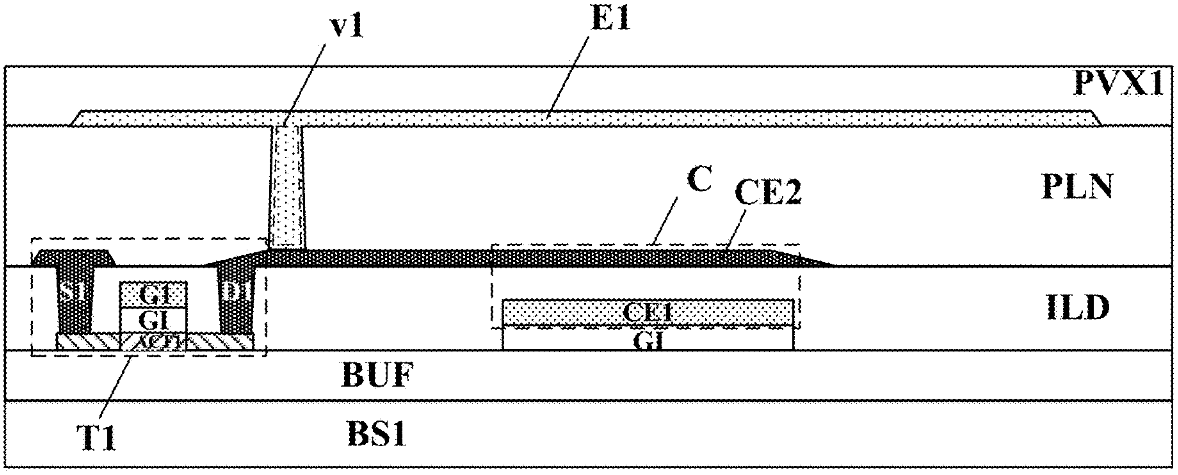
Figure 26A:
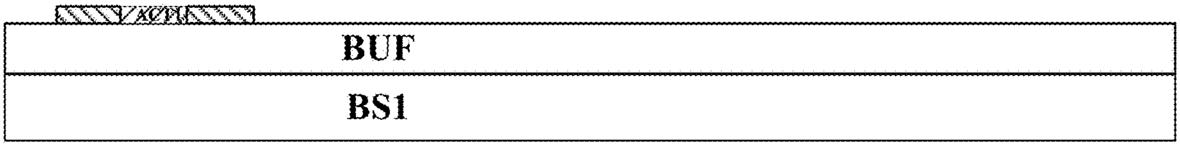
FIG. 26A to FIG. 26F illustrate a process of fabricating an imaging apparatus in some embodiments according to the present disclosure.
Figure 26B:
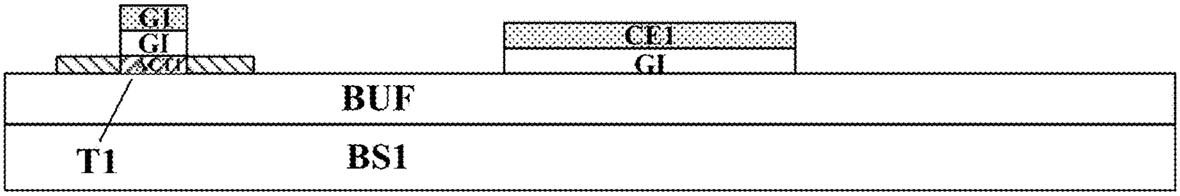
Figure 26C:
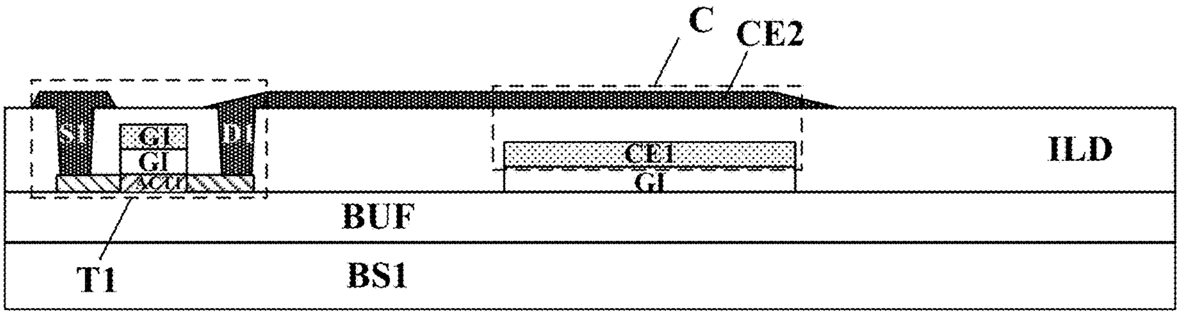
Figure 26D:
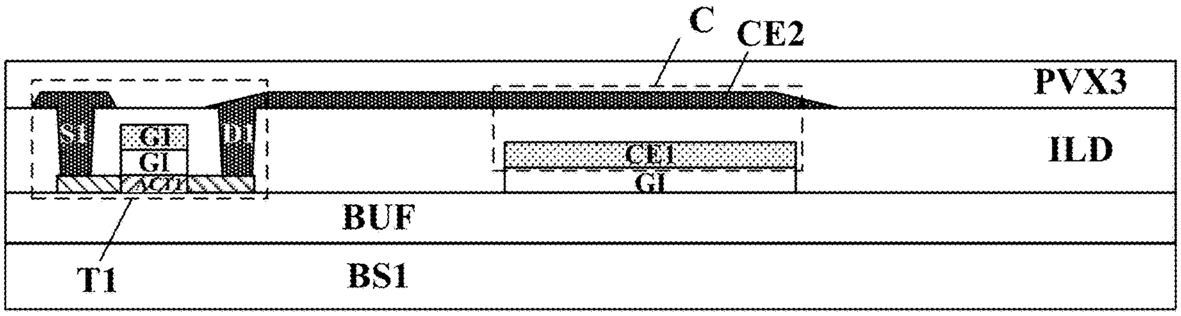
Figure 26E:
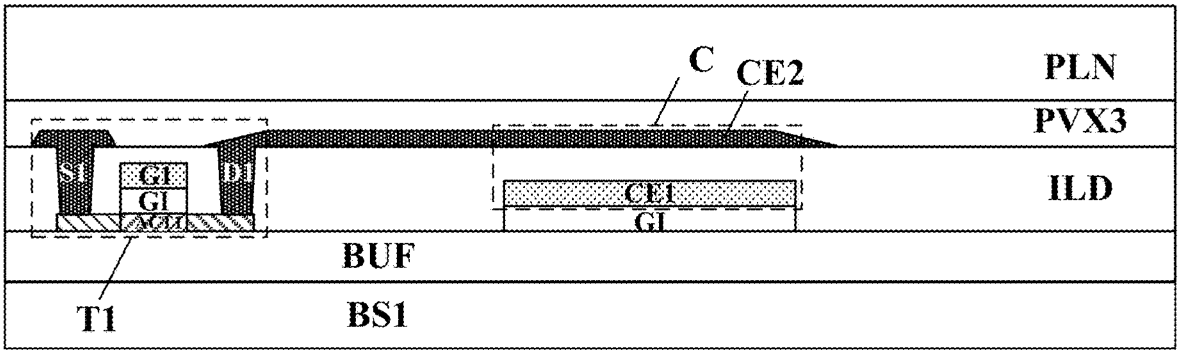
Figure 26F:
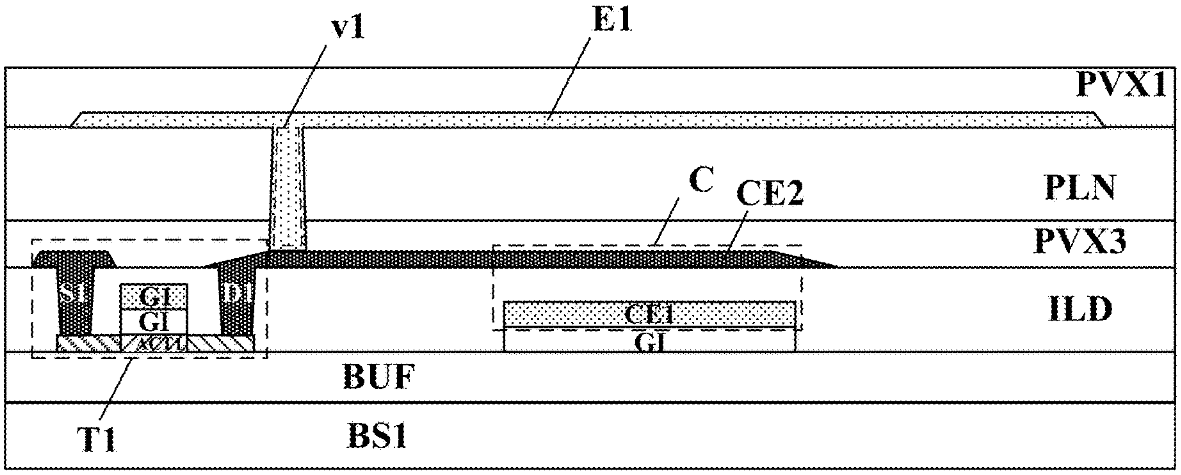

FIG. 24 illustrates an operation of an electronic printing system in some embodiments according to the present disclosure. Referring to FIG. 24, the electronic paper EP and the imaging apparatus IA in some embodiments may be implemented as components of a printer. In one example, the electronic paper EP may be a flexible electronic paper, e.g., having a size of an A4 or A3 paper. The imaging apparatus IA may be implemented as a bar comprising a plurality of rows of units for printing or scanning the electronic paper EP. The electronic printing system in some embodiments further includes a transfer drum TD for moving the electronic paper EP along a moving direction MD.

The present electronic printing system can realize multiple functionalities including printing, erasing, annotating, and scanning, allowing switching between the functionalities easily and obviating the need for multiple sets of equipment for performing multiple functionalities separately. As compared to related electronic display systems such as kindle, the electronic paper according to the present disclosure can be made ultra-thin with a greatly enhanced flexibility. Moreover, the imaging apparatus may also be made flexible. The multiple functionalities such as printing and scanning may be performed with the imaging apparatus, the electronic paper, or both, conforming to a shape of an object, e.g., an object with an uneven surface. The electronic printing system may be implemented with fewer integrated circuits, fewer storage, and lower power consumption. Further, the present electronic printing system can realize large area printing with a relatively small imaging apparatus. The present electronic printing system can also be implemented as components of a printer. The convenience and efficiency provided by the present electronic printing system is conducive for reduced paper usage and reduced carbon emission.

In another aspect, the present disclosure provides a method of fabricating an imaging apparatus. FIG. 25A to FIG. 25E illustrate a process of fabricating an imaging apparatus in some embodiments according to the present disclosure. Referring to FIG. 25A to FIG. 25E, in some embodiments, the method includes forming a buffer layer BUF on a first base substrate BS1; forming a first active layer ACT1 on a side of the buffer layer BUF away from the first base substrate BS1; forming a gate insulating layer GI on a side of the first active layer ACT1 away from the buffer layer BUF; forming a first gate electrode G1 on a side of the gate insulating layer GI away from the first active layer ACT1; forming a first capacitor electrode CE1 on a side of the gate insulating layer GI away from the buffer layer BUF; forming an inter-layer dielectric layer ILD on a side of the first gate electrode G1 and the first capacitor electrode CE1 away from the buffer layer BUF; forming a first source electrode S1, a first drain electrode D1, and a second capacitor electrode CE2 on a side of the inter-layer dielectric layer ILD away from the first base substrate BS1; forming a planarization layer PLN on a side of the first source electrode S1, the first drain electrode D1, and the second capacitor electrode CE2 away from the inter-layer dielectric layer ILD; forming a first via v1 extending through the planarization layer PLN; forming a first electrode E1 on a side of the planarization layer PLN away from the first base substrate BS1, the first electrode E1 connected to the first drain electrode D1 and/or the second capacitor electrode CE2 through the first via v1; and forming a first passivation layer PVX1 on a side of the first electrode E1 away from the first base substrate BS1.

In some embodiments, forming the planarization layer PLN comprises encapsulating the first transistor T1 and the capacitor C using an organic material having high hermeticity. Optionally, forming the first passivation layer PVX1 comprises depositing an organic material resistant to oxygen or moisture ingress on a side of the first electrode E1 away from the first base substrate BS1.

FIG. 26A to FIG. 26F illustrate a process of fabricating an imaging apparatus in some embodiments according to the present disclosure. Referring to FIG. 26A to FIG. 26F, in some embodiments, the method includes forming a buffer layer BUF on a first base substrate BS1; forming a first active layer ACT1 on a side of the buffer layer BUF away from the first base substrate BS1; forming a gate insulating layer GI on a side of the first active layer ACT1 away from the buffer layer BUF; forming a first gate electrode G1 on a side of the gate insulating layer GI away from the first active layer ACT1; forming a first capacitor electrode CE1 on a side of the gate insulating layer GI away from the buffer layer BUF; forming an inter-layer dielectric layer ILD on a side of the first gate electrode G1 and the first capacitor electrode CE1 away from the buffer layer BUF; forming a first source electrode S1, a first drain electrode D1, and a second capacitor electrode CE2 on a side of the inter-layer dielectric layer ILD away from the first base substrate BS1; forming a third passivation layer PVX3 on a side of the first source electrode S1, the first drain electrode D1, and the second capacitor electrode CE2 away from the first base substrate BS1; forming a planarization layer PLN on a side of the third passivation layer PVX3 away from the first base substrate BS1; forming a first via v1 extending through the planarization layer PLN; forming a first electrode E1 on a side of the planarization layer PLN away from the first base substrate BS1, the first electrode E1 connected to the first drain electrode D1 and/or the second capacitor electrode CE2 through the first via v1; and forming a first passivation layer PVX1 on a side of the first electrode E1 away from the first base substrate BS1.

In some embodiments, referring to FIG. 18, the method of fabricating an imaging apparatus includes forming a buffer layer BUF on a first base substrate BS1; forming a first active layer ACT1 and a second active layer ACT2 on a side of the buffer layer BUF away from the first base substrate BS1; forming a gate insulating layer GI on a side of the first active layer ACT1 and the second active layer ACT2 away from the buffer layer BUF; forming a first gate electrode G1 on a side of the gate insulating layer GI away from the first active layer ACT1, and a second gate electrode G2 on a side of the gate insulating layer GI away from the second active layer ACT2; forming a first capacitor electrode CE1 on a side of the gate insulating layer GI away from the buffer layer BUF; forming an inter-layer dielectric layer ILD on a side of the first gate electrode G1, the second gate electrode G2, and the first capacitor electrode CE1 away from the buffer layer BUF; forming a first source electrode S1, a first drain electrode D1, a second source electrode S2, a second drain electrode D2, and a second capacitor electrode CE2 on a side of the inter-layer dielectric layer ILD away from the first base substrate BS1; forming a third passivation layer PVX3 on a side of the first source electrode S1, the first drain electrode D1, the second source electrode S2, the second drain electrode D2, and the second capacitor electrode CE2 away from the first base substrate BS1; forming a planarization layer PLN on a side of the third passivation layer PVX3 away from the first base substrate BS1; forming a first electrode E1 on a side of the planarization layer PLN away from the first base substrate BS1; and forming a first passivation layer PVX1 on a side of the first electrode E1 away from the first base substrate BS1.

In some embodiments, referring to FIG. 21, the method of fabricating an imaging apparatus includes forming a buffer layer BUF on a first base substrate BS1; forming a first active layer ACT1 and a second active layer ACT2 on a side of the buffer layer BUF away from the first base substrate BS1; forming a gate insulating layer GI on a side of the first active layer ACT1 and the second active layer ACT2 away from the buffer layer BUF; forming a first gate electrode G1 on a side of the gate insulating layer GI away from the first active layer ACT1, and a second gate electrode G2 on a side of the gate insulating layer GI away from the second active layer ACT2; forming a first capacitor electrode CE1 on a side of the gate insulating layer GI away from the buffer layer BUF; an inter-layer dielectric layer ILD on a side of the first gate electrode G1, the second gate electrode G2, and the first capacitor electrode CE1 away from the buffer layer BUF; forming a first source electrode S1, a first drain electrode D1, a second source electrode S2, a second drain electrode D2, and a second capacitor electrode CE2 on a side of the inter-layer dielectric layer ILD away from the first base substrate BS1; forming a third passivation layer PVX3 on a side of the first source electrode S1, the first drain electrode D1, the second source electrode S2, the second drain electrode D2, and the second capacitor electrode CE2 away from the first base substrate BS1; forming a planarization layer PLN on a side of the third passivation layer PVX3 away from the first base substrate BS1; forming a first electrode E1 and a connecting line CL on a side of the planarization layer PLN away from the first base substrate BS1; and forming a first passivation layer PVX1 on a side of the first electrode E1 and the connecting line CL away from the first base substrate BS1. The connecting line CL connects the second drain electrode D2 of the second transistor T2 to the read line RL.

In some embodiments, referring to FIG. 23, the method of fabricating an imaging apparatus includes forming a buffer layer BUF on a first base substrate BS1; forming a first active layer ACT1 and a second active layer ACT2 on a side of the buffer layer BUF away from the first base substrate BS1; forming a gate insulating layer GI on a side of the first active layer ACT1 and the second active layer ACT2 away from the buffer layer BUF; forming a first gate electrode G1 on a side of the gate insulating layer GI away from the first active layer ACT1, and a second gate electrode G2 on a side of the gate insulating layer GI away from the second active layer ACT2; forming a first capacitor electrode CE1 on a side of the gate insulating layer GI away from the buffer layer BUF; forming an inter-layer dielectric layer ILD on a side of the first gate electrode G1, the second gate electrode G2, and the first capacitor electrode CE1 away from the buffer layer BUF; forming a first source electrode S1, a first drain electrode D1, a second source electrode S2, a second drain electrode D2, a second capacitor electrode CE2, and a connecting line CL on a side of the inter-layer dielectric layer ILD away from the first base substrate BS1; forming a third passivation layer PVX3 on a side of the first source electrode S1, the first drain electrode D1, the second source electrode S2, the second drain electrode D2, the second capacitor electrode CE2, and the connecting line CL away from the first base substrate BS1; forming a planarization layer PLN on a side of the third passivation layer PVX3 away from the first base substrate BS1; a first electrode E1 on a side of the planarization layer PLN away from the first base substrate BS1; and forming a first passivation layer PVX1 on a side of the first electrode E1 away from the first base substrate BS1. The connecting line CL connects the second drain electrode D2 of the second transistor T2 to the read line RL.

Figure 27A:
FIG. 27A to FIG. 27C illustrate a process of fabricating an electronic paper in some embodiments according to the present disclosure.
Figure 27B:
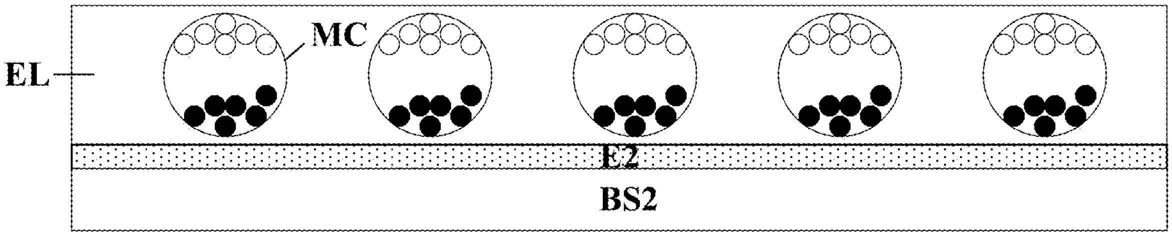
Figure 27C:
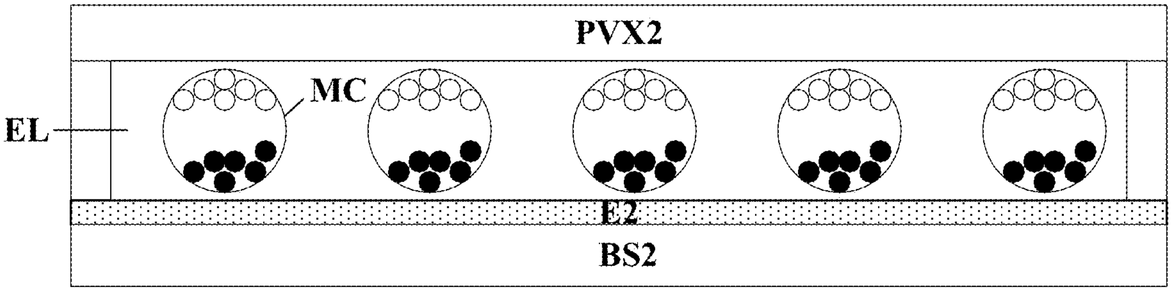

In another aspect, the present disclosure provides a method of fabricating an imaging apparatus. FIG. 27A to FIG. 27C illustrate a process of fabricating an electronic paper in some embodiments according to the present disclosure. Referring to FIG. 27A to FIG. 27C, the method in some embodiments includes forming a second electrode E2 on a second base substrate BS2; forming an electro-optic layer EL on a side of the second electrode E2 away from the second base substrate BS2; and forming a second passivation layer PVX2 to encapsulate the electro-optic layer EL using an organic material having high hermeticity.

Figure 28A:
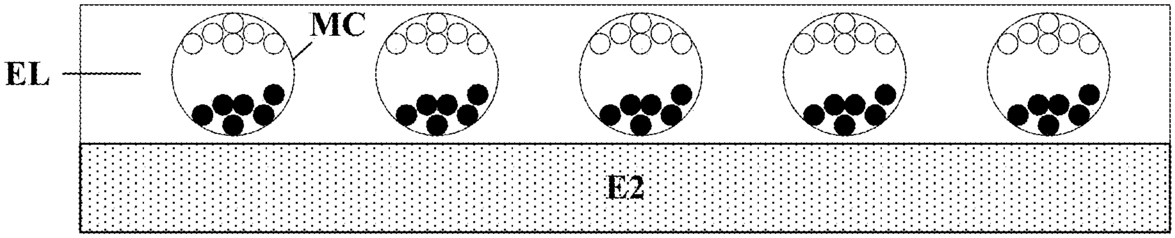
FIG. 28A to FIG. 28B illustrate a process of fabricating an electronic paper in some embodiments according to the present disclosure.
Figure 28B:
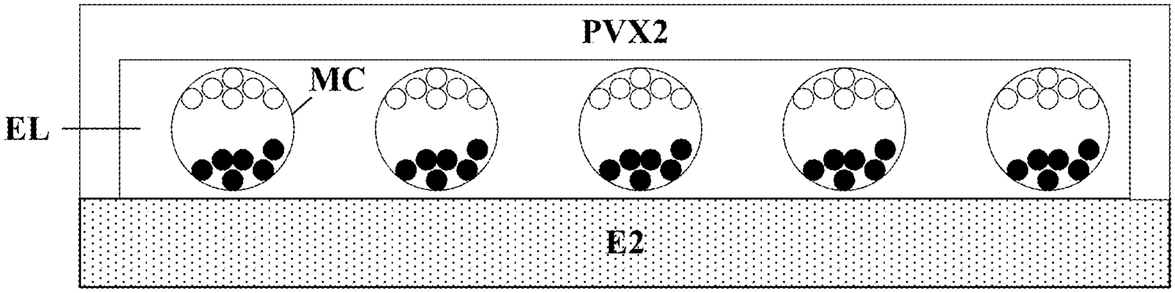

FIG. 28A to FIG. 28B illustrate a process of fabricating an electronic paper in some embodiments according to the present disclosure. Referring to FIG. 28A to FIG. 28B, the method in some embodiments includes providing a second electrode E2 as a second base substrate; forming an electro-optic layer EL on the second electrode E2; and forming a second passivation layer PVX2 to encapsulate the electro-optic layer EL using an organic material having high hermeticity. Optionally, the second electrode E2 is made of a metallic material.

In another aspect, the present disclosure provides an imaging apparatus. In some embodiments, the imaging apparatus includes a first electrode and a first passivation layer on the first electrode.

In some embodiments, the imaging apparatus includes a first transistor, a capacitor, and the first electrode. Optionally, a gate electrode of the first transistor is coupled to a gate line which is coupled to a gate driving integrated circuit; a first source electrode of the first transistor is coupled to a data line which is coupled to a data driving integrated circuit; a first drain electrode of the first transistor is coupled to the first electrode and a second capacitor electrode of the capacitor; a first capacitor electrode of the capacitor is coupled to a reference signal line; a second capacitor electrode of the capacitor is coupled to the first electrode and the first drain electrode of the first transistor; and the first electrode is coupled to the first drain electrode of the first transistor and the second capacitor electrode of the capacitor.

In some embodiments, the imaging apparatus includes a first transistor, a second transistor, a capacitor, and the first electrode. Optionally, a gate electrode of the first transistor is coupled to a first gate line which is coupled to a gate driving integrated circuit; a first source electrode of the first transistor is coupled to a data line which is coupled to a data driving integrated circuit; a first drain electrode of the first transistor is coupled to the first electrode and a second capacitor electrode of the capacitor; a gate electrode of the second transistor is coupled to a second gate line which is coupled to the gate driving integrated circuit; a second source electrode of the second transistor is coupled to the data line; a second drain electrode of the second transistor is coupled to the first electrode and the second capacitor electrode of the capacitor; a first capacitor electrode of the capacitor is coupled to a reference signal line; a second capacitor electrode of the capacitor is coupled to the first electrode, the first drain electrode of the first transistor, and the second drain electrode of the second transistor; and the first electrode is coupled to the first drain electrode of the first transistor, the second drain electrode of the second transistor, and the second capacitor electrode of the capacitor.

In some embodiments, the imaging apparatus includes a first transistor, a second transistor, a capacitor, and the first electrode. Optionally, a gate electrode of the first transistor is coupled to a first gate line which is coupled to a gate driving integrated circuit; a first source electrode of the first transistor is coupled to a data line which is coupled to a data driving integrated circuit; a first drain electrode of the first transistor is coupled to the first electrode and a second capacitor electrode of the capacitor; a gate electrode of the second transistor is coupled to a second gate line which is coupled to the gate driving integrated circuit; a second source electrode of the second transistor is coupled to a read line; a second drain electrode of the second transistor is coupled to the first electrode and the second capacitor electrode of the capacitor; a first capacitor electrode of the capacitor is coupled to a reference signal line; a second capacitor electrode of the capacitor is coupled to the first electrode, the first drain electrode of the first transistor, and the second drain electrode of the second transistor; and the first electrode is coupled to the first drain electrode of the first transistor, the second drain electrode of the second transistor, and the second capacitor electrode of the capacitor.

In some embodiments, the imaging apparatus further includes a connecting line connecting the second drain electrode of the second transistor to the read line.

Optionally, the read line is in a same layer as source electrodes and drain electrodes of the first transistor and the second transistor, and the second capacitor electrode; the connecting line is in a same layer as the first electrode; and the connecting line extends through at least one of a planarization layer or a third passivation layer to connect to the second drain electrode of the second transistor, and extends through at least one of the planarization layer or the third passivation layer to connect to the read line.

Optionally, the read line is in a same layer as source electrodes and drain electrodes of the first transistor and the second transistor, and the second capacitor electrode; the connecting line is in a same layer as gate electrodes of the first transistor and the second transistor; the second drain electrode extends through at least an inter-layer dielectric layer to connect to the connecting line; and the read line extends through at least the inter-layer dielectric layer to connect to the connecting line.

In some embodiments, the first passivation layer encapsulates transistors and capacitors of the imaging apparatus. Optionally, the first passivation layer is a multiple layer structure comprising sub-layers made of silicon oxide (SiOy), silicon nitride (SiNy, e.g., $Si_3N_4$), silicon oxynitride ($SiO_xN_y$), or graphene.

In some embodiments, the second passivation layer encapsulates the electro-optic layer and the second electrode of the electronic paper. Optionally, the second passivation layer is a multiple layer structure comprising sub-layers made of silicon oxide (SiOy), silicon nitride (SiNy, e.g., $Si_3N_4$), silicon oxynitride ($SiO_xN_y$), or graphene.

In another aspect, the present disclosure provides an electronic paper. In some embodiments, the electronic paper includes a second electrode, an electro-optic layer on the second electrode, and a second passivation layer on a side of the electro-optic layer away from the second electrode.

In some embodiments, the electronic paper is a passive electronic paper.

In some embodiments, the second electrode comprises a non-transparent electrode material.

In some embodiments, the second electrode is a second base substrate of the electronic paper. Optionally, the electronic paper is absent of a layer that covers a side of the second electrode away from the electro-optic layer and the second electrode.

In some embodiments, the electronic paper further includes a second passivation layer to encapsulate the electro-optic layer, the second passivation layer comprising an organic material having high hermeticity.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An electronic printing system, comprising an imaging apparatus and an electronic paper that can be detached from each other and can be coupled together to perform one or more functionalities;

wherein the imaging apparatus comprises a first electrode and a first passivation layer on the first electrode;

wherein the electronic paper comprises a second electrode, an electro-optic layer on the second electrode, and a second passivation layer on a side of the electro-optic layer away from the second electrode;

wherein, when the imaging apparatus and the electronic paper are coupled together to perform at least one of the one or more functionalities, the first electrode, the first passivation layer, the second passivation layer, the electro-optic layer, and the second electrode are sequentially arranged in a stacked structure, the first electrode and the second electrode being configured to apply an electric field to the electro-optic layer;

wherein, the first passivation layer and the second passivation layer can be detached from each other;

wherein the imaging apparatus comprises a first transistor, a second transistor, a capacitor, and the first electrode;

a gate electrode of the first transistor is coupled to a first gate line which is coupled to a gate driving integrated circuit;

a first source electrode of the first transistor is coupled to a data line which is coupled to a data driving integrated circuit;

a first drain electrode of the first transistor is coupled to the first electrode and a second capacitor electrode of the capacitor;

a gate electrode of the second transistor is coupled to a second gate line which is coupled to the gate driving integrated circuit;

a second source electrode of the second transistor is coupled to a read line;

a second drain electrode of the second transistor is coupled to the first electrode and the second capacitor electrode of the capacitor; and a first capacitor electrode of the capacitor is coupled to a reference signal line;

wherein the electronic printing system further comprises a connecting line connecting the second drain electrode of the second transistor to the read line;

wherein the read line is in a same layer as source electrodes and drain electrodes of the first transistor and the second transistor, and the second capacitor electrode;

the connecting line is in a same layer as the first electrode; and the connecting line extends through at least one of a planarization layer or a third passivation layer to connect to the second drain electrode of the second transistor, and extends through at least one of the planarization layer or the third passivation layer to connect to the read line.

2. The electronic printing system of claim 1, wherein the electronic paper is a passive electronic paper.

3. The electronic printing system of claim 1, wherein the imaging apparatus comprises a first transistor, a capacitor, and the first electrode;

a gate electrode of the first transistor is coupled to a gate line which is coupled to a gate driving integrated circuit;

a first source electrode of the first transistor is coupled to a data line which is coupled to a data driving integrated circuit;

a first drain electrode of the first transistor is coupled to the first electrode and a second capacitor electrode of the capacitor; and a first capacitor electrode of the capacitor is coupled to a reference signal line.

4. The electronic printing system of claim 1, wherein the read line is the data line.

5. The electronic printing system of claim 1, wherein the first passivation layer encapsulates transistors and capacitors of the imaging apparatus; and the first passivation layer is a multiple layer structure comprising sub-layers made of silicon oxide (SiOy), silicon nitride (SiNy, e.g., $Si_3N_4$), silicon oxynitride ($SiO_xN_y$), or graphene.

6. The electronic printing system of claim 1, wherein the second passivation layer encapsulates the electro-optic layer and the second electrode of the electronic paper; and the second passivation layer is a multiple layer structure comprising sub-layers made of silicon oxide (SiOy), silicon nitride (SiNy, e.g., $Si_3N_4$), silicon oxynitride ($SiO_xN_y$), or graphene.

7. The electronic printing system of claim 1, wherein the second electrode comprises a non-transparent electrode material.

8. The electronic printing system of claim 1, wherein the first electrode comprises a non-transparent electrode material, and the second electrode comprises a non-transparent electrode material.

9. The electronic printing system of claim 1, wherein the second electrode is a second base substrate of the electronic paper;

the electronic paper is absent of a layer that covers a side of the second electrode away from the electro-optic layer and the second electrode;

the imaging apparatus has a first size;

the electronic paper has a second size; and the first size is greater than the second size.

10. An electronic printing system, comprising an imaging apparatus and an electronic paper that can be detached from each other and can be coupled together to perform one or more functionalities;

wherein the imaging apparatus comprises a first electrode and a first passivation layer on the first electrode;

wherein the electronic paper comprises a second electrode, an electro-optic layer on the second electrode, and a second passivation layer on a side of the electro-optic layer away from the second electrode;

wherein, when the imaging apparatus and the electronic paper are coupled together to perform at least one of the one or more functionalities, the first electrode, the first passivation layer, the second passivation layer, the electro-optic layer, and the second electrode are sequentially arranged in a stacked structure, the first electrode and the second electrode being configured to apply an electric field to the electro-optic layer;

wherein, the first passivation layer and the second passivation layer can be detached from each other;

wherein the imaging apparatus comprises a first transistor, a second transistor, a capacitor, and the first electrode;

a gate electrode of the first transistor is coupled to a first gate line which is coupled to a gate driving integrated circuit;

a first source electrode of the first transistor is coupled to a data line which is coupled to a data driving integrated circuit;

a first drain electrode of the first transistor is coupled to the first electrode and a second capacitor electrode of the capacitor;

a gate electrode of the second transistor is coupled to a second gate line which is coupled to the gate driving integrated circuit;

a second source electrode of the second transistor is coupled to a read line;

a second drain electrode of the second transistor is coupled to the first electrode and the second capacitor electrode of the capacitor; and a first capacitor electrode of the capacitor is coupled to a reference signal line;

wherein the electronic printing system further comprises a connecting line connecting the second drain electrode of the second transistor to the read line;

wherein the read line is in a same layer as source electrodes and drain electrodes of the first transistor and the second transistor, and the second capacitor electrode;

the connecting line is in a same layer as gate electrodes of the first transistor and the second transistor;

the second drain electrode extends through at least an inter-layer dielectric layer to connect to the connecting line; and the read line extends through at least the inter-layer dielectric layer to connect to the connecting line.

11. A method of operating an electronic printing system, comprising:

providing an imaging apparatus and an electronic paper that can be detached from each other and can be coupled together to perform one or more functionalities;

assembling the imaging apparatus and the electronic paper so that a first electrode from the imaging apparatus and a second electrode from the electronic paper are capable of forming an electric field for driving an electro-optic layer in the electronic paper;

scanning an image displayed on the electronic paper by:

assembling the imaging apparatus and the electronic paper so that the first electrode from the imaging apparatus and the electro-optic layer from the electronic paper are close enough to induce a charge in the first electrode by a unit in the electro-optic layer;

detecting the charge as a sensing signal by transmitting the sensing signal through a signal line to a detection integrated circuit;

prior to inducing the charge in the first electrode, resetting the capacitor, and applying a constant voltage signal to the second electrode to induce a charge in the unit of the electronic paper;

inducing the charge in the first electrode by the constant voltage signal applied to the second electrode;

turning on a second transistor by an effective voltage of a second gate driving signal provided by a second gate line; and transmitting a sensing signal caused by the charge on the first electrode through the second transistor and a data line to a detection integrated circuit.

12. The method of claim 11, further comprising printing an image on the electronic paper by:

turning on a first transistor in the imaging apparatus by an effective voltage of a gate driving signal provided by a first gate line;

allowing a data signal provided by a data line to pass through the first transistor, charging a capacitor and the first electrode in the imaging apparatus; and applying an electric field formed by the first electrode from the imaging apparatus and the second electrode from the electronic paper to the electro-optic layer in the electronic paper, thereby electronically printing an image on the electronic paper.

13. The method of claim 11, further comprising resetting the electronic paper to an initial state by providing a reset signal through a data line to first electrodes respectively in all units of the imaging apparatus.

* * * * *